US009549327B2

(12) United States Patent
Kim et al.

(10) Patent No.: US 9,549,327 B2
(45) Date of Patent: Jan. 17, 2017

(54) METHOD FOR RECEIVING AND TRANSMITTING ACK/NACK INFORMATION, USER EQUIPMENT, AND BASE STATION

(75) Inventors: Jinmin Kim, Anyang-si (KR); Seunghee Han, Anyang-si (KR); Hyunwoo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 171 days.

(21) Appl. No.: 13/984,484

(22) PCT Filed: Mar. 21, 2012

(86) PCT No.: PCT/KR2012/002004
§ 371 (c)(1), (2), (4) Date: Aug. 8, 2013

(87) PCT Pub. No.: WO2012/128543
PCT Pub. Date: Sep. 27, 2012

(65) Prior Publication Data
US 2013/0315115 A1 Nov. 28, 2013

Related U.S. Application Data

(60) Provisional application No. 61/454,969, filed on Mar. 21, 2011, provisional application No. 61/466,945, filed on Mar. 24, 2011.

(51) Int. Cl.
*H04J 3/00* (2006.01)
*H04W 24/02* (2009.01)
(Continued)

(52) U.S. Cl.
CPC .......... *H04W 24/02* (2013.01); *H04J 11/0056* (2013.01); *H04L 1/1854* (2013.01);
(Continued)

(58) Field of Classification Search
CPC ........... H04W 72/042; H04W 72/0413; H04W 16/14;H04L 5/0053; H04L 5/0048; H04L 5/14; H04L 5/0055; H04L 5/1469; H04B 15/00; H04B 1/525; H04B 17/336; H04B 1/1036; H04B 17/24
(Continued)

(56) References Cited

U.S. PATENT DOCUMENTS

2008/0240072 A1* 10/2008 Bykovnikov .......... H04B 7/269 370/350
2009/0252077 A1* 10/2009 Khandekar ......... H04W 72/082 370/312
(Continued)

FOREIGN PATENT DOCUMENTS

WO WO 2010/138925 A1 12/2010

OTHER PUBLICATIONS

3GPP TSG RAN WG1 Meeting #62, LG Electronics, "Remaining Issue on Un HARQ for TDD," Madrid, Spain, Aug. 23-27, 2010, R1-104655, pp. 1-10.
(Continued)

*Primary Examiner* — Andrew Chriss
*Assistant Examiner* — Atique Ahmed
(74) *Attorney, Agent, or Firm* — Birch, Stewart, Kolasch & Birch, LLP

(57) ABSTRACT

The present invention provides a method and an apparatus for mitigating/eliminating interference between adjacent cells by configuring a subframe subset, in which the downlink transmission/reception of a specific cell to be user equipment-specific is limited. According to the present invention, the transmission/reception of a downlink signal for a specific user equipment in the subframe in which the downlink transmission/reception of the specific cell is limited, thereby mitigating/eliminating interference from an uplink of a different cell with the downlink of the specific cell from a base station to the specific user equipment.

11 Claims, 16 Drawing Sheets

(51) Int. Cl.
*H04J 11/00* (2006.01)
*H04L 5/00* (2006.01)
*H04L 1/18* (2006.01)

(52) U.S. Cl.
CPC .......... *H04L 5/0032* (2013.01); *H04L 5/0055* (2013.01); *H04L 5/0073* (2013.01)

(58) Field of Classification Search
USPC .......................................... 370/329, 252, 280
See application file for complete search history.

(56) References Cited

U.S. PATENT DOCUMENTS

| | | | | |
|---|---|---|---|---|
| 2009/0268685 | A1* | 10/2009 | Chen | H04L 1/1854 370/329 |
| 2010/0027446 | A1* | 2/2010 | Choi | H04L 5/0053 370/280 |
| 2010/0067593 | A1* | 3/2010 | McBeath | H04W 48/08 375/260 |
| 2012/0170524 | A1* | 7/2012 | Ren | H04L 1/1692 370/329 |
| 2012/0188877 | A1* | 7/2012 | Chin | H04W 24/10 370/241 |
| 2013/0182583 | A1* | 7/2013 | Siomina | H04W 24/10 370/252 |

OTHER PUBLICATIONS

3GPP TSG-RAN WG1#62, CMCC, "Backhaul Subframes Allocation and Un HARQ Timing for TDD," Madrid, Spain, Aug. 23-27, 2010, R1-104729, pp. 1-5.

* cited by examiner

METHOD FOR RECEIVING AND TRANSMITTING ACK/NACK INFORMATION, USER EQUIPMENT, AND BASE STATION

CROSS REFERENCE TO RELATED APPLICATIONS

This application is the National Phase of PCT/KR2012/002004 filed on Mar. 21, 2012, which claims priority under 35 U.S.C. 119(e) to U.S. Provisional Application Nos. 61/454,969 and 61/466,945 filed on Mar. 21, 2011 and Mar. 24, 2011 respectively, all of which are hereby expressly incorporated by reference into the present application.

TECHNICAL FIELD

The present invention relates to a wireless communication system. Particularly, the present invention relates to a method and apparatus for adjusting or mitigating inter-cell interference in a wireless communication system.

BACKGROUND ART

FIG. 1 illustrates a network including a plurality of cells. Specifically, FIG. 1(*a*) is a view illustrating a heterogeneous network wireless communications system including a macro Base Station (BS), BS A, and a micro BS, BS B, and FIG. 1(*b*) is a view illustrating a homogeneous network wireless communications system including macro BSs, BS A and BS B.

The heterogeneous network refers to a network where a macro BS and a micro BS co-exist even when the same Radio Access Technology (RAT) is used. The homogeneous network refers to a network comprised of macro BSs or a network comprised of micro BSs.

A macro BS represents a normal BS of a wireless communication system, having broad coverage (service area) and high transmission power. A geographic area in which a communication service is provided by a macro BS and BS A may be referred to as a macro cell. For example, a pico BS, a femto BS, or a relay may be the micro BS. A geographic area in which a communication service is provided by the micro BS, BS B, may be referred to as a micro cell, a pico cell, or a femto cell. The micro BS corresponds to a small-scale version of the macro BS. Accordingly, the micro BS may independently operate while performing most of the functions of the macro BS. The micro BS may be installed in an area covered by the macro BS (overlay type) or may be installed in a shadow area that cannot be covered by the macro BS (non-overlay type). As compared to the macro BS, the micro BS has a narrower coverage range and lower transmission power and may accommodate a smaller number of User Equipments (UEs).

Referring to FIG. 1(*a*), UEs, UE0 and UE1, may directly served by the macro BS A (hereinafter, such UEs are referred to as macro-UEs). A UE, UE2, may directly receive services from the micro BS (hereinafter such a UE is referred to as a micro-UE). In some cases, UE2 in the coverage area of the micro BS may receive services from the macro BS. In FIG. 1(*a*), it is assumed that UE2 is connected to the micro BS B.

Depending upon whether or not UE access is restricted, the micro BS may be categorized into two different types, the first type being a Closed Subscriber Group (CSG) micro BS and the second type being an Open Access (OA) or Open Subscriber Group (OSG) micro BS. The CSG micro BS may serve only specific UEs that are authorized and the OSG micro BS may serve all UEs without any particular access limitations.

As illustrated in FIG. 1(*a*), when UE2 served by the micro BS in a heterogeneous network receives a desired signal from the micro BS, UE2 may be subjected to interference by a strong signal transmitted from the macro BS. As another example, if UE1 served by the macro BS is adjacent to the micro BS as shown in FIG. 1(*a*), interference may be generated in a signal that UE1 receives from the macro BS by a strong signal from the micro BS. Such interference is referred to as inter-cell interference. While inter-cell interference generated on downlink (DL) from the BS to the UE has been described in the above examples, inter-cell interference may occur even on uplink (UL) from the UE to the BS.

Inter-cell interference may be generated in not only the heterogeneous network as shown in FIG. 1(*a*) but also the homogeneous network as shown in FIG. 1(*b*). Referring to FIG. 1(*b*), when UE2 which is served by the macro BS B and located at an edge of the cells A and B, which are served by the macro BSs, BS A and BS B, respectively receives a desired signal from the macro BS B, UE2 may be subjected to interference by a signal from the macro BS A. Alternatively, when UE1, which is located at a cell edge while being served by the macro BS A, receives a signal from the macro BS A, UE1 may be subjected to interference by a signal from the macro BS B adjacent to the macro BS A as shown in FIG. 1(*b*). A UL signal from the UE to the BS, as well as a DL signal from the BS to the UE, may also function as interference with respect to a neighboring cell.

Such mutual interference between cells causes deterioration of cell throughput. Furthermore, in the event of severe interference, network failure may occur.

DISCLOSURE

Technical Problem

An object of the present invention is to provide a method for mitigating interference between neighboring cells in order to relieve inter-cell interference.

It will be appreciated by persons skilled in the art that that the technical objects that can be achieved through the present invention are not limited to what has been particularly described hereinabove and other technical objects of the present invention will be more clearly understood from the following detailed description.

Technical Solution

In an aspect of the present invention, provided herein is a method for receiving, by a user equipment operating in time division duplex (TDD) mode, acknowledgement/negative acknowledgement (ACK/NACK) information from a base station. The method comprises: receiving information indicating a subframe subset including one or more subframes from the base station. The method comprises: not receiving the ACK/NACK information at a transmission timing of the ACK/NACK information when the transmission timing is a subframe belonging to the subframe subset. The method comprises: receiving the ACK/NACK information at the transmission timing when the transmission timing is a subframe which does not belong to the subframe subset.

In another aspect of the present invention, provided herein is a method for transmitting, by a base station, acknowledgement/negative acknowledgement (ACK/NACK) information to a user equipment operating in time division duplex (TDD) mode. The method comprises: transmitting information indicating a subframe subset including one or more subframes to the user equipment, dropping the ACK/NACK information at a transmission timing of the ACK/NACK information when the transmission timing is a subframe belonging to the subframe subset, and transmitting the ACK/NACK information at the transmission timing when the transmission timing is a subframe which does not belong to the subframe subset.

In another aspect of the present invention, provided herein is a user equipment operating in time division duplex (TDD) mode, for receiving Acknowledgement/Negative Acknowledgement (ACK/NACK) information from a base station. The user equipment comprises: a Radio Frequency (RF) unit configured to transmit and receive a radio signal and a processor configured to control the RF unit. The processor controls the RF unit to receive information indicating a subframe subset including one or more subframes from the base station. The processor does not control the RF unit to receive the ACK/NACK information at a transmission timing of the ACK/NACK information when the transmission timing is a subframe belonging to the subframe subset. The processor controls the RF unit to receive the ACK/NACK information at the transmission timing when the transmission timing is a subframe which does not belong to the subframe subset.

In another aspect of the present invention, provided herein is a base station for transmitting acknowledgement/negative acknowledgement (ACK/NACK) information to a user equipment operating in time division duplex (TDD) mode, including a Radio Frequency (RF) unit configured to transmit and receive a radio signal and a processor configured to control the RF unit. The processor controls the RF unit to transmit information indicating a subframe subset including one or more subframes to the user equipment. The processor controls the RF unit to drop the ACK/NACK information at a transmission timing of the ACK/NACK information when the transmission timing is a subframe belonging to the subframe subset. The processor controls the RF unit to transmit the ACK/NACK information at the transmission timing when the transmission timing is a subframe which does not belong to the subframe subset.

In each aspect of the present invention, the subframe subset may be user-specifically configured.

In each aspect of the present invention, the ACK/NACK information may be transmitted or received in an available downlink subframe after the transmission timing of the ACK/NACK information when the transmission timing is a subframe belonging to the subframe subset.

In each aspect of the present invention, a TDD downlink-uplink configuration used in the user equipment and/or base station may be different from a TDD downlink-uplink configuration of a radio frame used in another base station adjacent to the base station.

It will be appreciated by persons skilled in the art that that the effects that can be achieved through the present invention are not limited to what has been particularly described hereinabove and other advantages of the present invention will be more clearly understood from the following detailed description.

Advantageous Effects

According to the present invention, interference between neighboring cells can be reduced. Therefore, reliability of UL and/or DL transmission is increased and communication throughput is improved.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
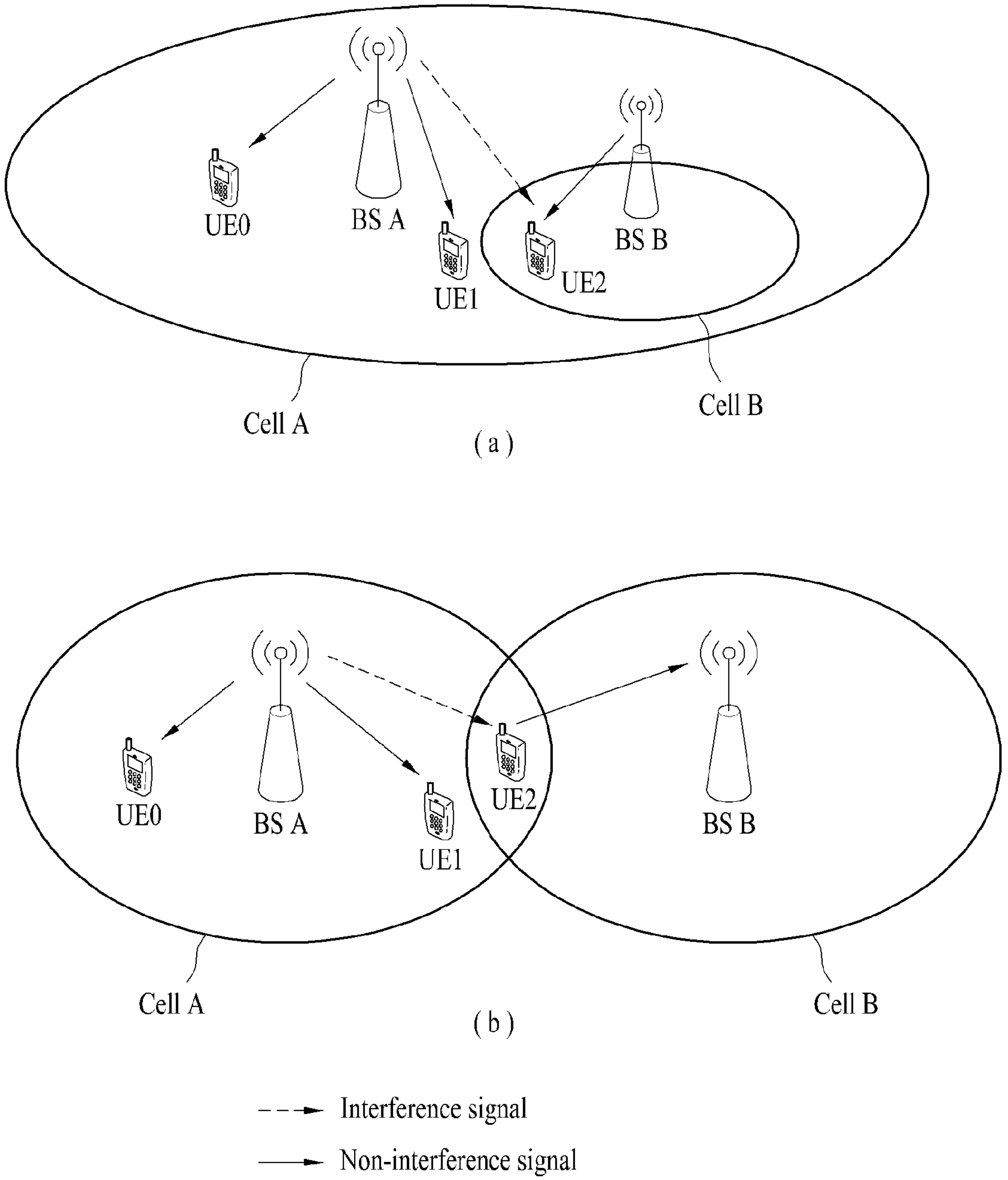
FIG. 1 illustrates a network including a plurality of cells.

Hereinafter, the exemplary embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out. The following detailed description includes detailed matters to provide full understanding of the present invention. However, it will be apparent to those skilled in the art that the present invention can be carried out without the detailed matters.

In some cases, to prevent ambiguity as to the concept of the present invention, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present invention, a User Equipment (UE) may be a fixed or mobile device. Examples of the UE include various devices that transmit and receive user data and/or various kinds of control information to and from a base station. The UE may be referred to as a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. In addition, in the present invention, a Base Station (BS) means a fixed station that performs communication with a UE and/or another BS, and exchanges various kinds of data and control information with the UE and another BS. The BS may be referred to as an Advanced Base Station (ABS), a Node-B (NB), an Evolved-NodeB (eNB), a Base Transceiver System (BTS), an Access Point (AP), or a Processing Server (PS).

In the present invention, a Physical Downlink Control Channel (PDCCH), a Physical Control Format Indicator Channel (PCFICH), a Physical Hybrid automatic retransmit request Indicator Channel (PHICH), and a Physical Downlink Shared CHannel (PDSCH) may indicate a set of time-frequency resources or Resource Elements (REs) carrying Downlink Control Information (DCI), a set of time-frequency resources or REs carrying Control Format Indicator (CFI), a set of time-frequency resources or REs carrying downlink ACK/NACK, and a set of time-frequency resources or REs carrying DL data, respectively. In addition, a Physical Uplink Control CHannel (PUCCH), a Physical Uplink Shared CHannel (PUSCH), and a Physical Random Access CHannel) (PRACH) may indicate a set of time-frequency resources or REs carrying Uplink Control Information (UCI), a set of time-frequency resources or REs carrying UL data, and a set of time-frequency resources REs carrying a random access signal, respectively. In the present invention, a time-frequency resource or RE that is assigned to or pertains to PDCCH/PCFICH/PHICH/PDSCH/PUCCH/PUSCH/PRACH may be called a PDCCH/PCFICH/PHICH/PDSCH/PUCCH/PUSCH/PRACH RE or PDCCH/PCFICH/PHICH/PDSCH/PUCCH/PUSCH/PRACH resource. Therefore, in the present invention, PUCCH/PUSCH/PRACH transmission of a UE may be conceptually identical to UL control information/UL data/random access signal transmission on PUSCH/PUCCH/PRACH, respectively. In addition, PDCCH/PCFICH/PHICH/PDSCH transmission of a BS may be conceptually identical to DL data/control information transmission over a PDCCH/PCFICH/PHICH/PDSCH, respectively.

Hereinafter, if a specific signal in a frame/subframe/slot/symbol/carrier/subcarrier is not transmitted, this is expressed as drop of transmission of the specific signal. For example, although a specific signal is allocated for transmission in a prescribed time-frequency resource, if a transmission device does not transmit the specific signal or transmits the specific signal at zero transmission power, this is expressed as 'the transmission device drops transmission of the specific signal'.

In the present invention, a cell refers to a prescribed geographic area in which one BS or one antenna group provides a communication service. Accordingly, in the present invention, communication of a UE with a specific cell may mean that the UE communicates with a BS, an antenna, or an antenna group which provides a communication service to the specific cell. In addition, a DL/UL signal of a specific cell refers to a DL/UL signal with a BS, an antenna, or an antenna group which provides a communication service to the specific cell. A channel state/quality of a specific cell refers to a channel state/quality of a channel or communication link formed between an antenna group which provides a communication service to the specific cell and a UE. An interfering cell or an aggressor cell refers to a cell which creates interference with respect to a specific cell. That is, if a signal of a neighboring cell generates interferes with respect to a signal of a specific cell, the neighboring cell is an interfering cell with respect to the specific cell and the specific cell is an interfered cell or a victim cell with respect to the neighboring cell. In this way, if neighboring cells generate interference therebetween or with respect to other cells, such interference is referred to as Inter-Cell Interference (ICI). A BS of an interfering cell is referred to as an interfering BS or an aggressive BS and a BS of an interfered cell is referred to as an interfered BS or a victim BS.

Figure 2:
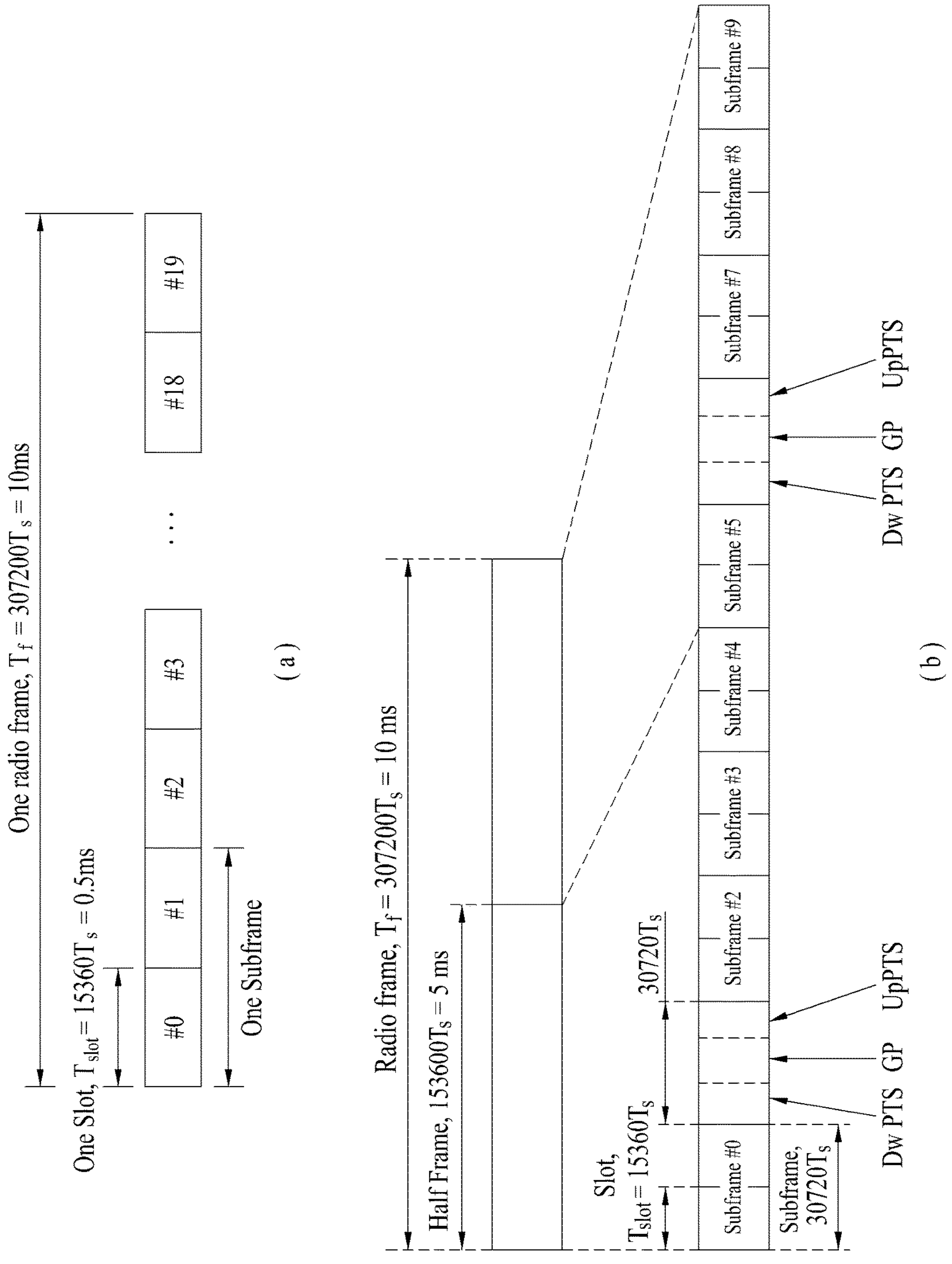
FIG. 2 illustrates an exemplary structure of a radio frame used in a wireless communication system.

FIG. 2 illustrates an exemplary structure of a radio frame used in a wireless communication system. Particularly, FIG. 2(*a*) illustrates an exemplary structure of a radio frame which may be used in FDD in 3GPP LTE(-A) and FIG. 2(*b*) illustrates an exemplary structure of a radio frame which may be used in TDD in 3GPP LTE(-A).

Referring to FIG. 2, a 3GPP LTE(-A) radio frame is 10 ms ($307{,}200T_s$) in duration. The radio frame is divided into 10 subframes of equal size. Subframe numbers may be assigned to the 10 subframes within the radio frame, respectively. $T_s$ denotes sampling time, where $T_s=1/(2048*15\text{ kHz})$. Each subframe is 1 ms long and further divided into two slots. 20 slots are sequentially numbered 0 to 19 in a radio frame. Each slot is 0.5 ms in duration. A time interval in which one subframe is transmitted is defined as a Transmission Time Interval (TTI). Time resources may be distinguished by a radio frame number (or radio frame index), a subframe number (or subframe index), a slot number (or slot index), and the like.

A radio frame may have different configurations according to duplex mode. In FDD mode for example, since DL transmission and UL transmission are discriminated according to frequency, a radio frame includes either DL subframes or UL subframes for a specific frequency band operating in a specific carrier frequency. In TDD mode, since DL transmission and UL transmission are discriminated according to time, a radio frame includes both DL subframes and UL subframes for a specific frequency band operating on a specific carrier frequency.

Table 1 shows an exemplary DL-UL configuration of subframes in a radio frame in TDD mode.

TABLE 1

| Uplink-downlink | Downlink-to-Uplink Switch-point | Subframe number | | | | | | | | | |
|---|---|---|---|---|---|---|---|---|---|---|---|
| configuration | periodicity | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D is a DL subframe, U is a UL subframe, and S is a special subframe. The special subframe includes three fields, i.e., a Downlink Pilot Time Slot (DwPTS), Guard Period (GP), and Uplink Pilot Time Slot (UpPTS). DwPTS is a time period reserved for DL transmission and UpPTS is a time period reserved for UL transmission. Table 2 shows an exemplary special frame configuration.

TABLE 2

| Special subframe configuration | Normal cyclic prefix in downlink | | | Extended cyclic prefix in downlink | | |
|---|---|---|---|---|---|---|
| | DwPTS | UpPTS: Normal cyclic prefix in uplink | UpPTS: Extended cyclic prefix in uplink | DwPTS | UpPTS: Normal cyclic prefix in uplink | UpPTS: Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
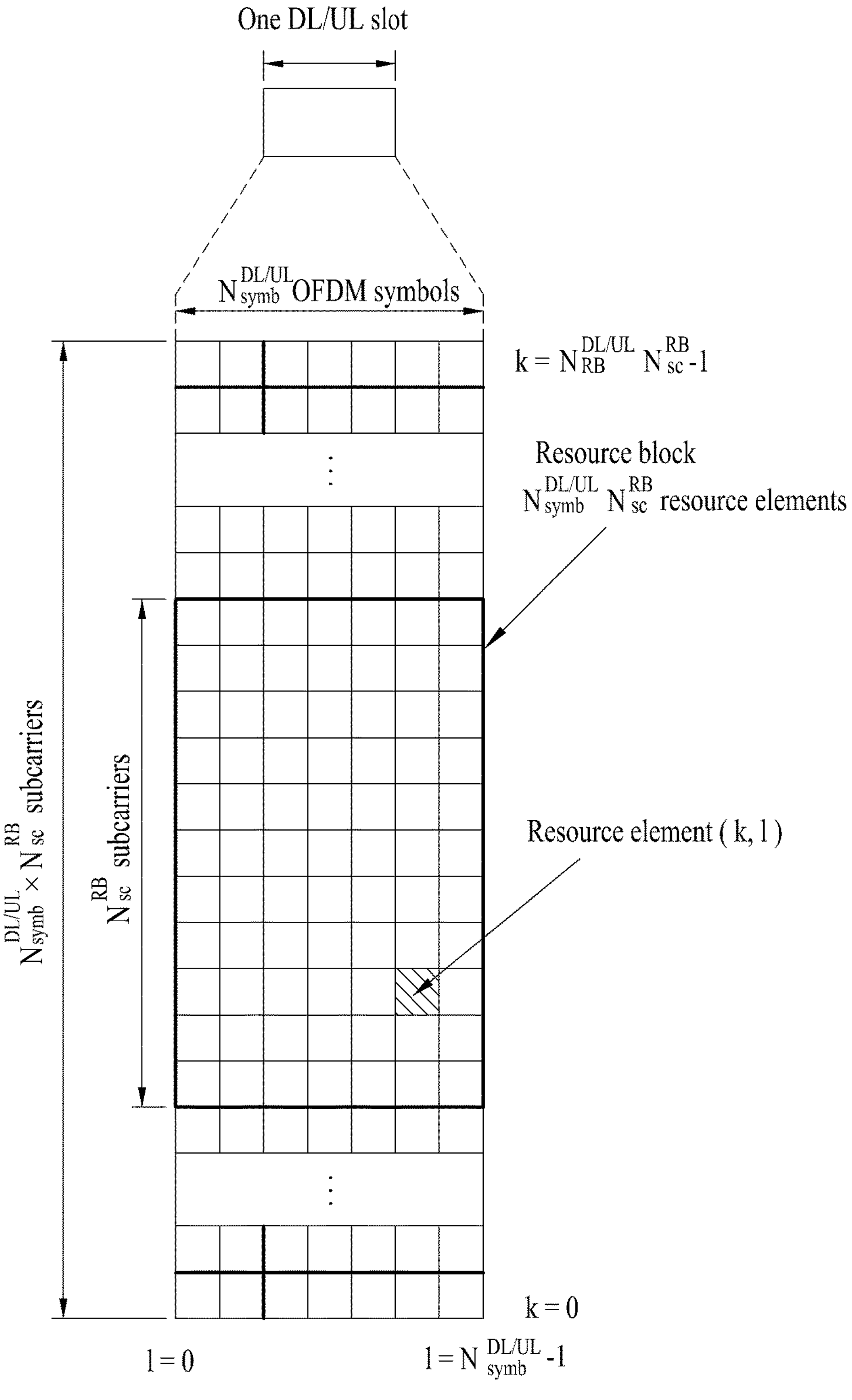
FIG. 3 illustrates an exemplary structure of a DL/UL slot in a wireless communication system.

FIG. 3 illustrates an exemplary structure of a DL/UL slot in a wireless communication system. Specifically, FIG. 3 illustrates the structure of a resource grid in a 3GPP LTE(-A) system.

Referring to FIG. 3, a slot includes a plurality of OFDM symbols in the time domain and a plurality of Resource Blocks (RBs) in the frequency domain. An OFDM symbol may refer to one symbol duration. An RB includes a plurality of subcarriers in the frequency domain. An OFDM symbol may also be called an SC-FDM symbol etc. according to a multiple access scheme. The number of OFDM symbols per slot may vary depending on channel bandwidth and CP length. For instance, one slot includes 7 OFDM symbols in case of a normal CP, whereas one slot includes 6 OFDM symbols in case of an extended CP. While a subframe is shown in FIG. 2 as having a slot with 7 OFDM symbols for convenience of description, embodiments of the present invention are also applicable to subframes with any other number of OFDM symbols. A resource including one OFDM symbol and one subcarrier is referred to as a Resource Element (RE) or a tone.

Referring to FIG. 3, a signal transmitted in each slot may be expressed by a resource grid including $N^{DL/UL}_{RB} \cdot N^{RB}_{sc}$ subcarriers and $N^{DL/UL}_{symb}$ OFDM or SC-FDM symbols. $N^{DL}_{RB}$ represents the number of RBs in a DL slot and $N^{UL}_{RB}$ represents the number of RBs in a UL slot. $N^{DL}_{RB}$ and $N^{UL}_{RB}$ depend on a DL transmission bandwidth and a UL transmission bandwidth, respectively. Each OFDM symbol includes $N^{DL/UL}_{RB} \cdot N^{RB}_{sc}$ subcarriers. The number of subcarriers per carrier is determined by Fast Fourier Transform (FFT) size. Subcarriers may be divided into data subcarriers for data transmission, reference signal subcarriers for reference signal transmission, and null subcarriers for a guard band and a Direct Current (DC) component. The null carriers for the DC component are unused remaining subcarriers and are mapped to a carrier frequency $f_0$ in a process of generating an OFDM signal. The carrier frequency is also referred to as a center frequency. $N^{DL}_{symb}$ represents the number of OFDM or SC-FDMA symbols in the DL slot and $N^{UL}_{symb}$ represents the number of OFDM or SC-FDMA symbols in the UL slot. $N^{RB}_{sc}$ represents the number of subcarriers in one RB. An RB is defined as $N^{DL/UL}_{symb}$ (e.g. 7) consecutive OFDM symbols or SC-FDMA symbols in the time domain and $N^{RB}_{sc}$ (e.g. 12) consecutive subcarriers in the frequency domain. Therefore, one PRB includes $N^{DL/UL}_{symb} \cdot N^{RB}_{sc}$ REs. Each RE in the resource grid may be uniquely identified by an index pair (k,l) in a slot. k is a frequency-domain index ranging from 0 to $N^{DL/UL}_{RB} \cdot N^{RB}_{sc}-1$ and l is a time-domain index ranging from 0 to $N^{DL/UL}_{symb}-1$.

Figure 4:
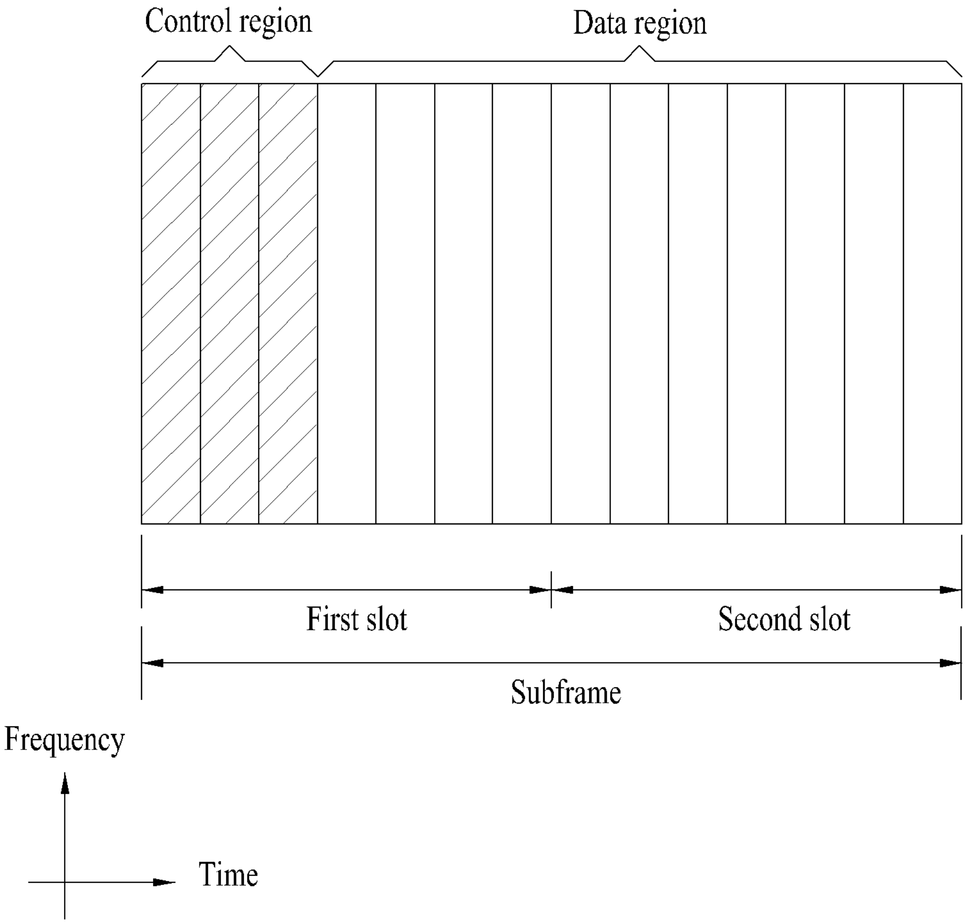
FIG. 4 illustrates an exemplary structure of a DL subframe used in a 3GPP LTE(-A) system.

FIG. 4 illustrates an exemplary structure of a DL subframe used in a 3GPP LTE(-A) system.

Referring to FIG. 4, a DL subframe may be divided into a control region and a data region. The control region includes one or more OFDM symbols, starting from the first OFDM symbol. In the DL subframe of the 3GPP LTE(-A) system, the control region is configured as a region in which a PDCCH can be transmitted. Accordingly, the control region in the DL subframe is also referred to as a PDCCH region. The number of OFDM symbols used for the control region in the DL subframe may be independently configured on a subframe basis and signaled through a PCFICH. A BS may transmit control information to a UE or UEs in the control region. To transmit control information, a PDCCH, a PCFICH, a PHICH, etc. may be allocated to the control region.

The BS may transmit information related to resource assignment of a Paging CHannel (PCH) and a DL Shared CHannel (DL-SCH) that are transport channels, a UL scheduling grant (hereinafter, UL grant), a DL scheduling grant (hereinafter, DL grant), Hybrid Automatic Retransmission reQuest (HARQ) information, a Downlink Assignment Index (DAI), a Transmit Power Control (TPC) command, etc. to each UE or UE group on a PDCCH. Information related to resource assignment carried by a PDCCH may include RB assignment information, i.e. frequency resource information, used for UL/DL transmission. The BS may allocate frequency resources for a UE through the PDCCH.

The BS may transmit data to a UE or UE group in the data region. Data transmitted in the data region is referred to as user data. A PDSCH may be allocated to the data region for user data transmission. The PCH and the DL-SCH are transmitted on the PDSCH. A UE may decode control information received on a PDCCH, whereby read data received on the PDSCH. The size and usage of Downlink Control Information (DCI) transmitted on a PDCCH may vary according to PDCCH format and the size of the DCI may vary according to coding rate. Information indicating to which UE or UE group PDSCH data is transmitted and information indicating how the UE or UE group should receive and decode the PDSCH data are transmitted on the PDCCH. For example, it is assumed that a specific PDCCH is CRC-masked with a Radio Network Temporary Identifier (RNTI) 'A' and information about data transmitted using a radio resource 'B' (e.g. frequency location) and using transport format information 'C' (e.g. transmission block size, modulation scheme, coding information, etc.) is transmitted through a specific DL subframe. Then, the UE monitors the PDCCH using RNTI information thereof. The UE having the RNTI 'A' receives the PDCCH and receives the PDSCH indicated by 'B' and 'C' through information of the received PDCCH.

A plurality of PDCCHs may be transmitted in the control region. A UE may monitor the plurality of PDCCHs to detect a PDCCH thereof. Basically, the UE does not know the location at which a PDCCH thereof is transmitted. Therefore, the UE performs blind detection (referred also to as blind decoding) for all PDCCHs of a corresponding DCI format in every subframe until a PDCCH having an identity thereof is received.

Figure 5:
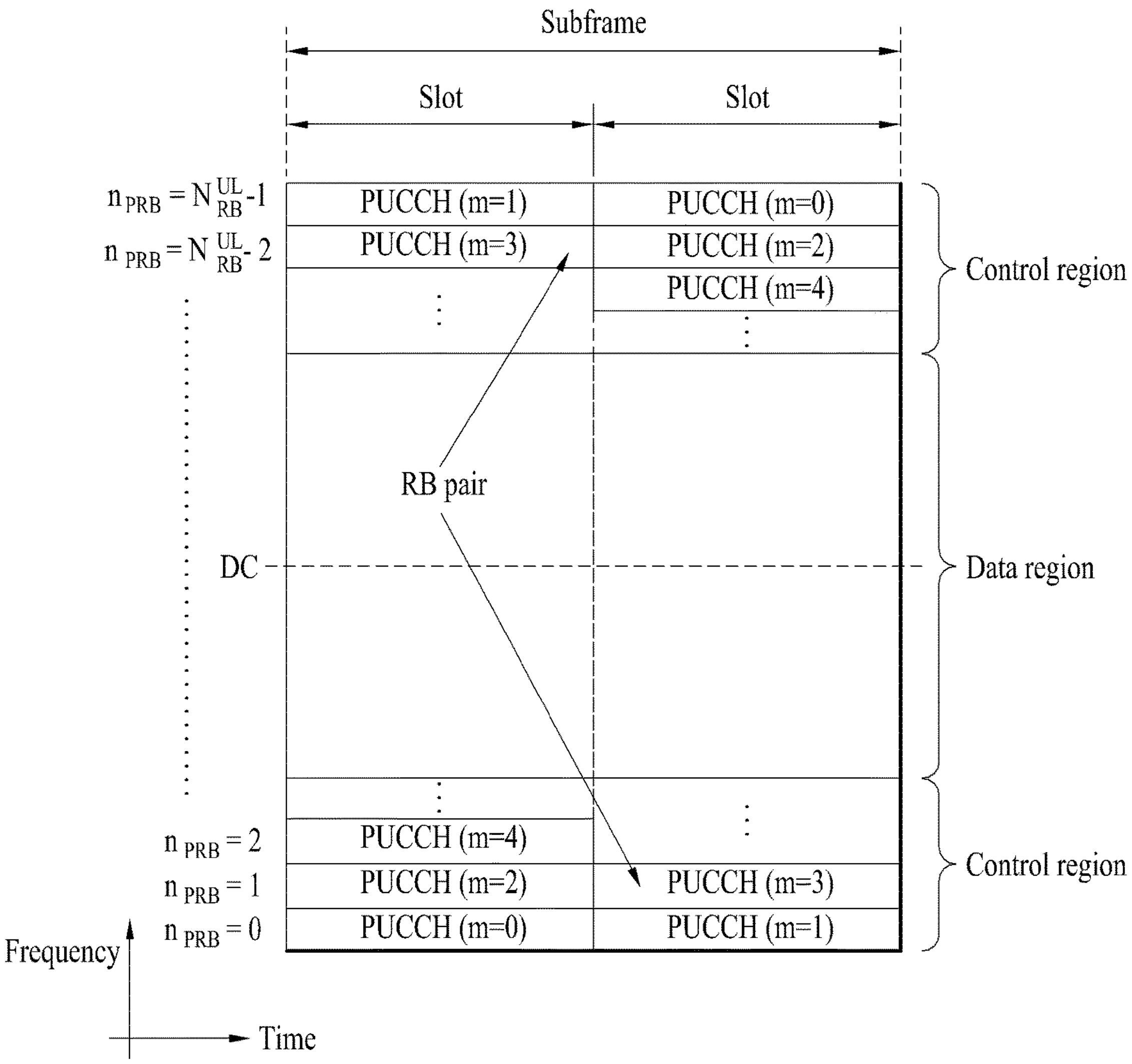
FIG. 5 illustrates an exemplary structure of a UL subframe in a 3GPP LTE(-A) system.

FIG. 5 illustrates an exemplary structure of a UL subframe in a 3GPP LTE(-A) system.

Referring to FIG. 5, a UL subframe may be divided into a data region and a control region in the frequency domain. One or more Physical Uplink Control CHannels (PUCCHs) may be allocated to the control region to deliver Uplink Control Information (UCI). One or more Physical Uplink Shared Channels (PUSCHs) may be allocated to the data region to deliver user data. If a UE adopts SC-FDMA for UL transmission, it cannot transmit a PUCCH and a PUSCH simultaneously on a single carrier in order to maintain single carrier characteristics.

In a UL subframe, subcarriers distant from a DC subcarrier are used as the control region. In other words, subcarriers located at both ends of a UL transmission bandwidth are assigned for UCI transmission. The DC subcarrier is reserved without being used for signal transmission and is mapped to a carrier frequency $f_0$ in a frequency up-conversion process performed by an OFDM/SC-FDM signal generator.

A PUCCH for a UE is allocated to an RB pair, which belongs to resources operating in a carrier frequency, in a subframe. The RBs of the RB pair occupy different subcarriers in two slots. This is called frequency hopping of an RB pair allocated to a PUCCH over a slot boundary. However, if frequency hopping is not used, an RB pair occupies the same subcarriers. Irrespective of frequency hopping, a PUCCH for one UE is assigned to an RB pair in one subframe and therefore the same PUCCH is transmitted once through one RB in each slot, a total of two times, in one UL subframe. The UE is assigned a PUCCH resource for UCI transmission by the BS through higher layer signaling, an explicit scheme, or an implicit scheme.

Hereinafter, embodiments of the present invention for mitigating ICI will be described based on a heterogeneous network. However, the following embodiments may be applied in the same manner to a homogeneous network. In addition, although the embodiments of the present invention will be described focusing upon a single carrier, the embodiments of the present invention may be applied to a multi-carrier situation used for communication between a UE and a BS by aggregating a plurality of carriers in order to mitigate ICI. If the same or overlapping frequency band is present among frequency bands used in contiguous cells, the embodiments of the present invention may be applied in the same or overlapping frequency band.

<Cell-Specific Restricted DL Subframe Set>

Referring to FIG. 1(*a*), in a macro-micro heterogeneous network, a macro cell may create strong interference to a UE of a micro cell, especially a micro-UE at a cell boundary. Accordingly, a method for cancelling UL/DL interference for data, L1/L2 control signals, synchronization signals, and reference signals is needed. An Inter-Cell Interference Cancellation (ICIC) scheme may be handled in the time, frequency, and/or spatial domain. For convenience, the micro-UE is assumed to be an entity to be protected from ICI. In this case, an aggressor creating interference is a macro cell (or macro BS).

A BS of the macro cell creating ICI may cell-specifically allocate an Almost Blank Subframe (ABS) or a Multimedia Broadcast over Single Frequency Network (MBSFN) subframe in a radio frame. In describing the embodiments of the present invention, a subframe subset which is cell-specifically configured to restrict DL transmission of an aggressor cell or a victim cell is referred to as a Cell-Specific Restricted DL Subframe Set (CSRSS) and a DL subframe belonging to the CSRSS is referred to as a CSRS. The CSRS represents a subframe configured not to be used for transmission of a normal DL signal (a subframe configured such that DL transmit power or DL interference is restricted) except for a specific DL signal. The CSRS may be repeated to have a prescribed pattern in one or more radio frames (e.g. four radio frames). The BS of the macro cell may inform a BS of a micro cell of a CSRSS configuration (e.g. a 40-bit bitmap) through a backhaul link and the BS of the micro cell may perform scheduling a micro-UE using the CSRSS configuration. For example, the micro-UE may be scheduled only during a CSRSS duration. That is, the micro-UE is scheduled in the same subframe as the CSRSS, thereby receiving signals having less interference from the BS of the micro cell.

The CSRS may be configured using an ABS without a PDSCH and an MBSFN subframe without a Physical Multicast CHannel (PMSCH) and the PDSCH. In the ABS and the MBSFN subframe, a PCFICH, a PDCCH, and a PHICH may be transmitted/received. However, when the CSRS is configured using the ABS, although interference with the PDSCH of a victim cell may be mitigated due to the ABS without the PDSCH, there is a limit to interference cancellation because the PDSCH region of the ABS includes a Cell-specific Reference Signal (CRS). When the CSRSS is configured using the MBSFN subframe, although an effect of interference mitigation may be increased because the CRS cannot be transmitted/received in the PDSCH region of the MBSFN subframe, it is difficult to configure all subframes of the CSRSS using only the MBSFN subframe because the MBSFN subframe is configured under specific restriction conditions. Accordingly, the CSRS may be allocated using the following restriction conditions by combining the ABS and the MBSFN subframe. The following restriction conditions are proposed to guarantee transmission of a DL signal performing an important role in communication between the BS and the UE.

Condition 1: UL HARQ (Hybrid Automatic Retransmit reQuest) Timing

To accurately transmit ACK/NACK information for data transmitted by the UE to the BS, reliability of a PHICH carrying the ACK/NACK information, i.e. reliability of a UL HARQ, should be ensured. In FDD, a CSRS is allocated in the unit of a PHICH transmission period (e.g. 8 ms) in order to guarantee the reliability of the PHICH transmitted by the micro BS to the micro-UE. In TDD, since PHICH transmission periods vary with TDD DL-UL configurations, the CSRS may be allocated at a different period according to a DL-UL configuration.

Condition 2: Physical Broadcast CHannel (PBCH) and Synchronization Signal

A PBCH carries information about a PHICH configuration, a DL bandwidth, and a system frame number. That is, the PBCH carries essential information necessary when the UE initially accesses a network of the BS. A Primary Synchronization Signal (PSS) and a Secondary Synchronization Signal (SSS) carry information about synchronization of a frequency/time resource and a cell identity (ID). Therefore, since the PBCH and PSS/SSS are indispensable for UL/DL formation when the UE communicates with the BS, it is desirable not to drop signal transmission of the PBCH and PSS/SSS. The PBCH and PSS/SSS are transmitted/received in subframes #0 and #5 and, therefore, the CSRSS should not be configured in subframes #0 and #5.

Condition 3: System Information Message

System Information Block (SIB) type 1 (SIB1) carries not only information about time domain scheduling of other SIB but also parameters necessary for determination as to whether a specific cell is suitable for cell selection. Namely, since the SIB1 carries essential information needed when the UE initially accesses the network of the BS, it is preferable that transmission of the SIB1 is not dropped. The SIB1 is transmitted/received on a PDSCH allocated to subframe #5 of a radio frame having an even number. Accordingly, the CSRSS should not be configured in subframe #5 of the even-numbered radio frame in which transmission of the SIB1 is configured.

Condition 4: Paging Message

The BS transmits a paging message to the UE in idle mode to page the UE. Upon receiving the paging message, the UE establishes a communication link with the network of the BS through ranging, network re-entry, etc. Since the paging message is located on a PDSCH transmitted/received in subframe #9, a PDSCH transmitted/received in subframes #4 and #9, or a PDSCH transmitted/received in subframes #0, #4, #5, and #9, it is desirable not to configure the CSRSS in the above subframes in which transmission of the paging message is configured.

Considering the above-described restriction conditions 1 to 4, the shortest period of a CSRSS pattern corresponds to 40 subframes in FDD. When considering the fact that one subframe is 1 ms in 3GPP LTE(-A), allocation of the CSRSS may form a pattern in the unit of 40 ms.

Figure 6:
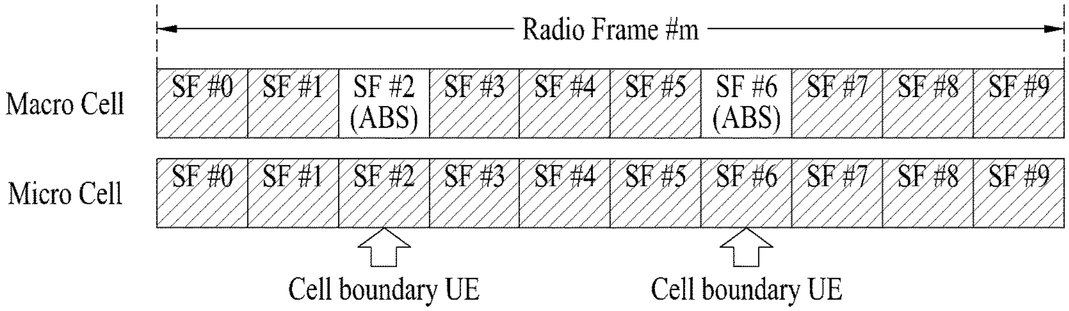
FIG. 6 illustrates an exemplary method for canceling Inter-Cell Interference (ICI) using a Cell-Specific Restricted DL Subframe Set (CSRSS)

FIG. 6 illustrates an exemplary method for canceling ICI using a CSRSS. Specifically, in FIG. 6, it is assumed that a macro cell is an aggressor cell and a micro cell is a victim cell, and a method is illustrated for mitigating interference that a BS of the macro cell, which is the aggressor cell, creates with respect to UEs of the victim cell, using a time-domain interference cancellation scheme.

Referring to FIG. 6, a CSRSS is comprised of subframes #2 and #6 configured as ABSs. The micro BS allocates a UL/DL signal for a UE(s) located at an edge of the micro cell to subframe #2 and/or #6, thereby providing an interference mitigated signal to the UE(s) located at the edge of the micro cell.

In FDD, a restricted DL subframe set pattern is formed in the unit of 40 ms in consideration of HARQ timing and the period of a synchronization signal. The CSRSS in TDD is different from that in FDD in that CSRSS patterns are formed at different periods according to TDD DL-UL configurations. For example, in TDD, a CSRSS period may be determined as follows.

TABLE 3

| DL-UL configuration | DL-to-UL Switch-point periodicity | Subframe number 0 | 1 | 2 | 3 | 4 | 5 | 6 | 7 | 8 | 9 | Restricted subframe set pattern |
|---|---|---|---|---|---|---|---|---|---|---|---|---|
| 0 | 5 ms | D | S | U | U | U | D | S | U | U | U | 70 ms |
| 1 | 5 ms | D | S | U | U | D | D | S | U | U | D | 20 ms |
| 2 | 5 ms | D | S | U | D | D | D | S | U | D | D | |
| 3 | 10 ms | D | S | U | U | U | D | D | D | D | D | |
| 4 | 10 ms | D | S | U | U | D | D | D | D | D | D | |
| 5 | 10 ms | D | S | U | D | D | D | D | D | D | D | |
| 6 | 5 ms | D | S | U | U | U | D | S | U | U | D | 60 ms |

The aforementioned CSRSS is cell-specifically allocated. Thus, one BS (e.g. BS B in FIG. 1) allocates DL transmission only in a corresponding subframe subset or one BS (e.g. BS A in FIG. 1) restricts DL transmission or DL transmit power in the corresponding subframe subset.

Meanwhile, referring to Tables 1 and 3, a 3GPP LTE(-A) system defines a variety of DL-UL configurations. However, in most communication standards up to now, BSs in the same network are not permitted to have different DL-UL configurations in order to prevent DL/UL of one BS from being subjected to interference by UL/DL of another BS. If the BSs in the same network have the same DL-UL configuration, since only interference between DL and DL and/or interference between UL and UL are present in the network, only a method for cancelling interference between DL and DL and/or interference between UL and UL is needed. However, if the BSs should use the same DL-UL configuration, since various DL-UL configurations considering UL traffic and DL traffic of each cell cannot be used, advantages of the various DL-UL configurations cannot be obtained and cell throughput is deteriorated. Accordingly, for efficient utilization of cell throughput, it is preferable to permit different TDD DL-UL configurations in each cell or in a heterogeneous cell which may be present in the cell.

Figure 7:
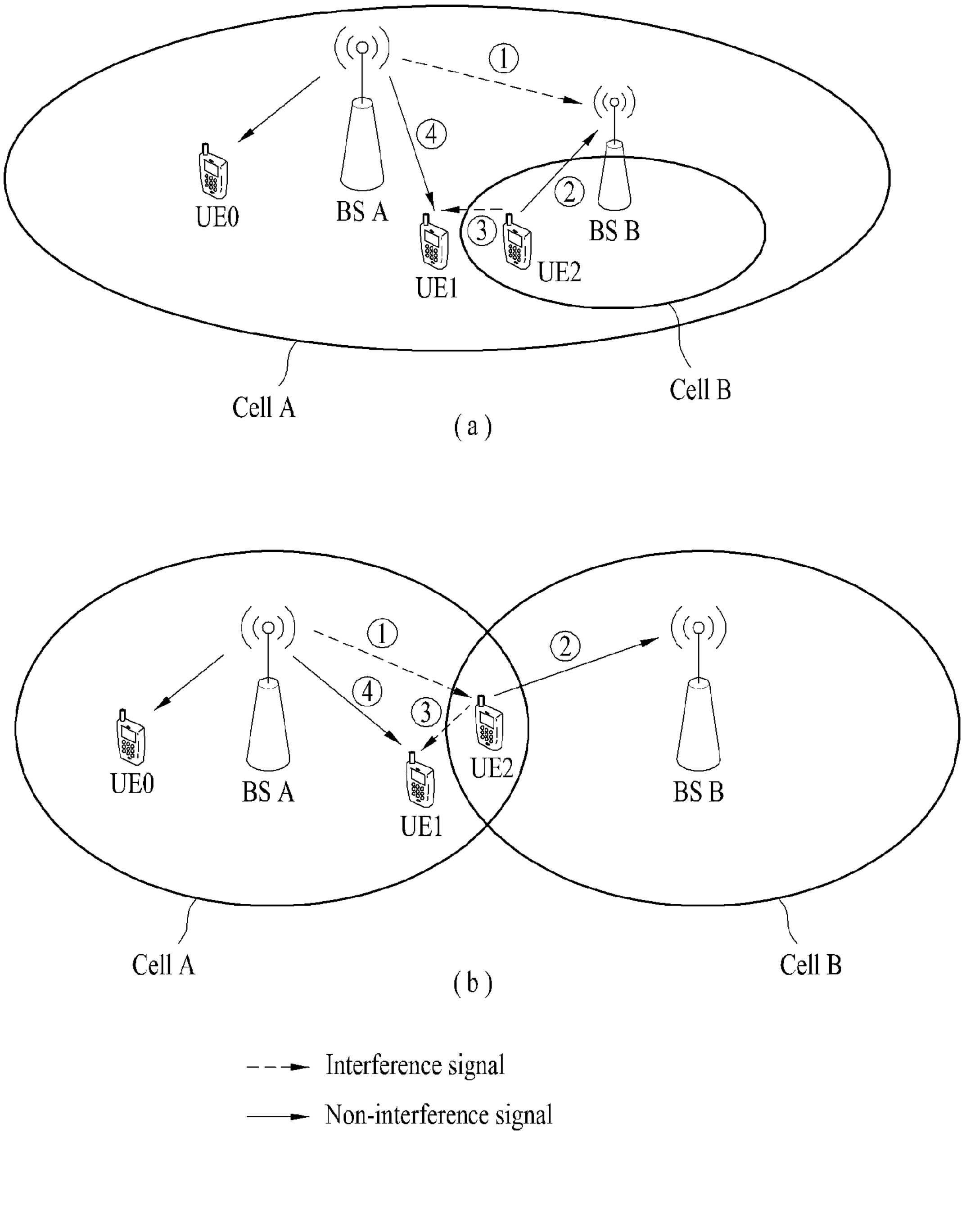
FIG. 7 illustrates exemplary interference between cells having different Time Division Duplex (TDD) DL-UL configurations.

FIG. 7 illustrates exemplary interference between cells having different TDD DL-UL configurations. Specifically, FIG. 7 illustrates an interference situation when a BS A operates in DL time and a BS B operates in UL time. FIG. 7(*a*) illustrates exemplary ICI when a macro cell and a micro cell in a heterogeneous network have different TDD DL-UL configurations. FIG. 7(*b*) illustrates exemplary ICI when macro cells in a homogeneous network have different TDD DL-UL configurations. Hereinbelow, a subframe in which DL time and UL time of contiguous BSs overlap is referred to as a collision subframe.

Referring to FIG. 7(*a*) or FIG. 7(*b*), if a DL signal ① of the BS A causes strong interference in a UL signal ② transmitted by a UE2 in a cell A to a BS B, the BS B cannot properly receive the UL signal ②. Specifically, since the DL signal of the macro BS is transmitted at high power, the DL signal of the macro BS has a high possibility of causing strong interference in a signal of a neighboring BS. As the distance between the macro BS and another BS adjacent to the macro BS or the distance between the macro BS and a UE connected to another BS adjacent to the macro BS becomes nearer, substantial interference is caused by the DL signal of the macro BS. ICI is generated not only between BS and BS or between BS and UE but also between UEs. Referring to FIG. 7(*a*) or FIG. 7(*b*), a UE UE1 connected to the BS A is subjected to interference due to a UL signal transmitted by UE2, that is adjacent to UE1 and is connected to the BS B, and a situation in which UE1 cannot properly receive a DL signal from the BS A may occur. Such interference is identically generated at a time when the BS A operates in UL and the BS B operates in DL.

To control interference generated when neighboring cells use different TDD DL-UL configurations, the afore-mentioned CSRSS may be allocated. The CSRSS considers only the case where neighboring cells have the same DL-UL configuration and a DL signal of a victim cell can be protected using the CSRSS. For example, referring to FIG. 7(*a*) or FIG. 7(*b*), if the CSRSS is allocated, the BS A may not transmit the DL signal ① or may transmit at low power in a subframe corresponding to an ABS or an MBSFN subframe. Then, interference by which the DL signal ① affects the UL signal ② of UE2 may be mitigated in the subframe corresponding to the ABS or the MBSFN subframe. However, even if the CSRSS is allocated, it is difficult to mitigate interference by which a UL signal ③ transmitted by UE2 connected to the BS B affects a DL signal ④ received by UE1 connected to the BS A. Therefore, a method for mitigating/cancelling interference that a UL signal transmitted by a UE or UE groups of an aggressor cell creates with respect to a DL signal of a victim cell is needed.

<UE-Specific/UE-Group-Specific Restricted DL Subframe Set>

Since interference between UEs is mainly encountered when a UE is located at a cell edge, restriction of DL transmission to a UE(s) of a victim cell by a BS of the victim cell in a subframe(s) in which interference caused by a UL signal transmitted by a UE of an aggressor cell is present as in the above-described CSRSS causes reduction in DL throughput. Therefore, a method for decreasing reduction in DL throughput and simultaneously protecting a DL signal of a UE located at a cell edge is needed. To solve such a problem, the present invention proposes a UE-Specific or UE-group-Specific Restricted DL Subframe Set (USRSS). The USRSS may be used to mitigate interference affecting a UE or a UE group located at a cell edge by a UE signal transmitted by a neighboring UE or UE group. For convenience of description, a UE or a UE group will be referred to as a UE hereinbelow. Accordingly, even if the "UE" is changed to "UE-group" in the following description, the embodiments of the present invention are identically applicable.

The USRSS proposed in the present invention has the following Characteristic 1 and/or Characteristic 2.

Characteristic 1: A BS does not configure (or allocate or transmit) a PDCCH and a PDSCH, which should be transmitted to a corresponding UE(s), in a USRSS duration.

In a USRSS duration, i.e. a subframe configured as a USRSS, even a PDCCH masked with a Random Access RNTI (RA-RNTI), a Cell RNTI (C-RNTI), a Semi-Persistent Scheduling (SPS) C-RNTI, a temporary C-RNTI, a Transmit Power Control PUCCH RNTI (TPC-PUCCH-RNTI), or a Transmit Power Control PUSCH RNTI (TPC-PUSCH-RNTI) may not be transmitted.

Characteristic 2: A BS does not configure (or transmit) a PHICH, which should be transmitted to a corresponding UE(s), in a USRSS duration.

If a UE transmits a PUSCH in an n-th subframe, a 3GPP LET(-A) system, up to now, specifies that a BS transmits a PHICH for the PUSCH in an (n+4)-th subframe in case of FDD and transmits the PHICH for the PUSCH in an $(n+k_{PHICH})$-th subframe according to a TDD DL-UL configuration in the case of TDD. For example, $k_{PHICH}$ is defined as follows.

TABLE 4

| TDD UL-DL | UL subframe number n | | | | | | | | | |
|---|---|---|---|---|---|---|---|---|---|---|
| configuration | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

In Table 4, numbers defined in a UL subframe in each DL-UL configuration correspond to $k_{PHICH}$.

The above restriction condition 1 for the CSRSS is proposed to exclude a subframe(s) corresponding to a PHICH timing in order to ensure the reliability of transmission of the PHICH. That is, according to the restriction condition 1 for the CSRSS, PHICH transmission/reception for a UE(s) in a corresponding cell can be guaranteed even when the CSRSS is allocated.

In the present invention, however, if a subframe in which the PHICH is to be transmitted/received belongs to a USRSS, the PHICH is not transmitted/received in the corresponding subframe. For example, referring to FIG. 7(*a*) or FIG. 7(*b*), the BS A may configure a subframe(s) in which strong interference caused by the UL signal of UE2 occurs as a USRSS and may inform the UE1 experiencing strong interference by the UL signal of UE2 that the USRSS is configured. The BS A does not transmit a PHICH for UE1 in the subframe(s) configured as the USRSS and the UE1 does not detect/receive the PHICH in the subframe(s) configured as the USRSS.

Upon allocating the USRSS for a UE(s), the BS may direct the UE(s) not to perform PDCCH monitoring or not to decode the PHICH in a subframe(s) corresponding to the USRSS, using a Radio Resource Control (RRC) parameter or a partial bit of DCI in a PDCCH. The BS may transmit configuration information of the USRSS to the corresponding UE(s) and the configuration information may include a bitmap indicating location of a subframe constituting the USRSS among subframes corresponding to the period of a USRSS pattern. Hereinbelow, a subframe constituting the USRSS is referred to as a UE-Specific Restricted Subframe (USRS). For example, a bitmap of Table 5 or Table 6 may be used to indicate the location of the USRS in the period of the USRSS pattern.

TABLE 5

| | Subframe Number | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| USRS allocation | 0 | 0 | 0 | 1 | 0 | 0 | 0 | 0 | 0 | 0 | 0 | 0 | 0 | 0 | 0 | 0 | 0 | 0 | 0 | 0 |

TABLE 6

| Collision Subframe Number | 3 | 13 |
|---|---|---|
| USRS allocation | 1 | 0 |

In Table 5 and Table 6, it is assumed that the USRSS is allocated at a pattern of 20 ms, subframes #3 and #13 are collision subframes, and subframe #3 is configured as a USRS. In Table 5 and Table 6, a subframe corresponding to a bit set to ‘1’ is the USRS and a subframe corresponding to a bit set to ‘0’ is a normal subframe. Conversely, ‘1’ may be defined to indicate the normal subframe and ‘0’ may be defined to indicate the USRS. Table 5 shows a method of signaling the location of the USRS in a USRSS pattern, using a bitmap including 20 bits in one-to-one correspondence with all subframes corresponding to the pattern period of the USRSS. Table 6 shows a method of signaling the location of the USRS in the USRSS pattern, using a bitmap including a bit(s) corresponding one by one to a collision subframe(s) rather than all subframes in the USRSS pattern. Methods other than the methods shown in Table 5 and Table 6 may be used to signal the location of the USRS. For example, since the UE is aware of the TDD DL-UL configuration of a BS accessed thereby, the UE may also be aware of DL subframes among subframes corresponding to the USRSS pattern period. Accordingly, the BS may signal a subframe corresponding to the USRS to the UE, using a bitmap including bits corresponding one to one to DL subframes in the USRSS pattern period.

In the present invention, since the USRS is UE-specifically or UE-group-specifically configured, all time durations in which communication link of an opposite direction are formed in adjacent cells, i.e. all collision subframes, need not be USRSs for a specific UE. The collision subframe may become a USRS. However, even when the UE is subjected to strong interference in some collision subframes, if the UE is subjected to only slight interference in other collision subframes, the BS may configure only the collision subframe experiencing strong interference as a USRS and signal the configuration of the USRS. If there is another UE experiencing strong interference from a neighboring cell in other collision subframe, the BS configures the above other collision subframe as a USRS for the above another UE and may signal the configuration of the USRS to the above other UEs.

Figure 8:
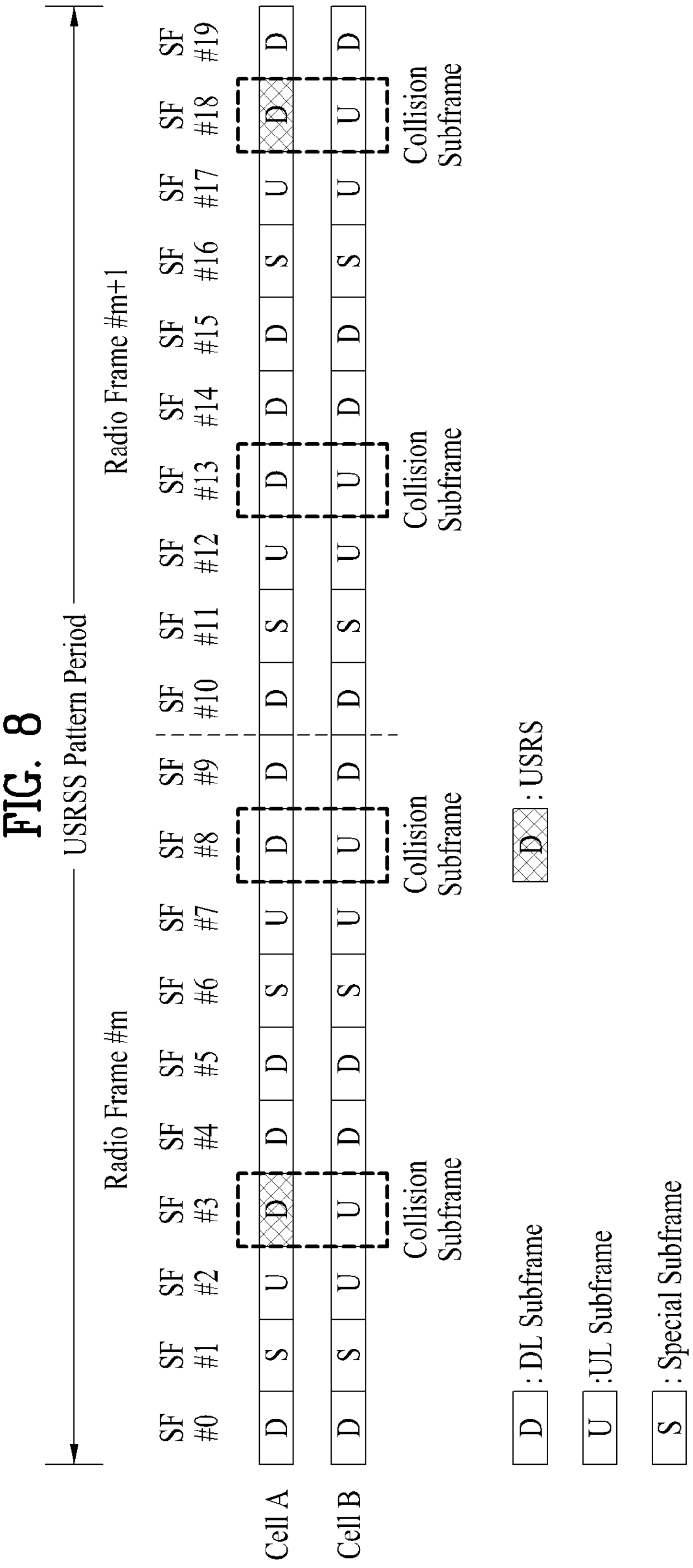
FIG. 8 illustrates an exemplary method for canceling ICI using a UE-Specific Restricted DL Subframe Set (USRSS)

FIG. 8 illustrates an exemplary method for canceling ICI using a USRSS. Specifically, it is assumed in FIG. 8 that the BS A of FIG. 7(*a*) or FIG. 7(*b*) configures a radio frame according to TDD DL-UL configuration #2 of Table 1 and the BS B configures a radio frame according to TDD DL-UL configuration #1 of Table 1. In this case, if a USRSS pattern period is 20 ms and subframes in a corresponding pattern period are numbered 0 to 19, the BS B and BS A form radio communication links in opposite directions in subframes #3, #8, #13, and #18.

Referring to FIG. 8, in subframes #3, #8, #13, and #18, the BS A operates in DL and the BS B operates in UL. Therefore, DL transmission transmitted to a UE(s) located in a cell A, to which the BS A provides a communication service, may be subjected to interference by UL transmission caused by a UE(s) located in a cell B, to which the BS B provides a communication service. The BS A may configure a USRSS including a subframe subjected to strong interference by the cell B as a USRS and transmit configuration information for the USRSS to the corresponding UE(s). For example, the BS A may transmit the bitmap configured as shown in Table 7 to the corresponding UE(s) according to the embodiment of Table 5 or may transmit the bitmap configured as shown in Table 8 to the corresponding UE(s) according to the embodiment of Table 6.

TABLE 7

| | Subframe Number | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| USRS allocation | 0 | 0 | 0 | 1 | 0 | 0 | 0 | 0 | 0 | 0 | 0 | 0 | 0 | 0 | 0 | 0 | 0 | 0 | 1 | 0 |

TABLE 8

| Collision Subframe Number | 3 | 8 | 13 | 18 |
|---|---|---|---|---|
| USRS allocation | 1 | 0 | 0 | 1 |

In Tables 7 and 8, ‘1’ indicates that a corresponding subframe is a USRS and ‘0’ indicates that a corresponding subframe is a normal subframe rather than the USRS.

Notably, if USRSS configuration information is transmitted as shown in Table 8, since it is difficult for the UE(s) connected to the BS A to know which TDD DL-UL configuration the BS B includes, the BS A preferably transmits information about the TDD DL-UL configuration of the BS B or information about collision subframes to the UE(s) separately or together.

If a PHICH transmission timing for a corresponding UE overlaps with a USRSS duration and thus is dropped, a PHICH may be transmitted/received in a next available DL subframe. For example, referring to FIG. 7(*a*) or FIG. 7(*b*), a normal DL subframe (i.e. a subframe not configured as a CSRSS or USRSS) may be the available DL subframe. Alternatively, since PHICH transmission is permitted in the CSRSS, a DL subframe in which a PHICH resource is reserved among DL subframes belonging to the CSRSS may be the available DL subframe. The DL subframe available for the corresponding UE may be implicitly determined as the first normal DL subframe after a DL subframe corresponding to a PHICH timing for a PUSCH transmitted by the corresponding UE or as a normal DL subframe corresponding to a PHICH timing for a next PUSCH transmitted by the corresponding UE. Alternatively, the BS may explicitly indicate an available DL subframe to the corresponding UE, using an RRC (Radio Resource Control) parameter or a DCI format of a PDCCH. In addition, an available DL subframe determined by various schemes may be used together with the USRSS of the present invention.

Meanwhile, when a PHICH transmission timing for a specific UE collides with a USRSS duration for the UE and, thus, PHICH transmission is dropped, piggyback schemes, which will be described below, may be used by the BS in order to transmit ACK/NACK information carried by the dropped PHICH in a PHICH resource of an available DL subframe. Hereinafter, a PHICH for a specific UE, which is dropped in an original transmission timing due to collision of a PHICH transmission timing with a USRSS duration and is transmitted in a next available DL subframe, is referred to as a piggyback PHICH.

(1) A BS may inform a UE of a piggyback PHICH group and a sequence index through an RRC parameter. The UE may know the PHICH group and an orthogonal sequence index therefor using the RRC parameter received from the BS and may detect (or receive) the piggyback PHICH in a DL subframe, using the PHICH group and orthogonal sequence.

(2) In a USRSS duration for a corresponding UE, if 8 Multiple User Multiple Input Multiple Output (MU-MIMO) is not supported or a rank caused by Single User MIMO (SU-MIMO) is less than 8, the BS may transmit a PHICH which has not been transmitted in the USRSS duration, i.e. a piggyback PHICH, to the UE while maintaining a minimum Physical Resource Block (PRB) index of UL resource assignment.

PHICH resources in a DL subframe in which the PHICH resources are reserved are discriminated by an index pair ($n^{group}_{PHICH}$, and $n^{seq}_{PHICH}$). $n^{group}_{PHICH}$ denotes a PHICH group number and $n^{seq}_{PHICH}$ denotes an orthogonal sequence index in the PHICH group.

The PHICH group and sequence index of PHICHs, normally transmitted in a PHICH transmission timing, may be generated using the following equation.

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$

[Equation 1]

In Equation 1, $N^{PHICH}_{SF}$ denotes a spreading factor size used for PHICH modulation. $I^{lowest\_index}_{PRB\_RA}$ denotes the lowest PRB index for PUSCH transmission. $N^{group}_{PHICH}$ denotes the number of PHICH groups. $I_{PHICH}$ is 1 for a PUSCH transmitted in subframe #4 or #9 of TDD DL-UL configuration #0 of Table 1 and 0 for the other cases.

In case of an FDD frame shown in FIG. 2(a), the number of PHICH groups, $N^{group}_{PHICH}$, is uniform in all subframes and the number of PHICH groups in one subframe is given by Equation 2.

$$N_{PHICH}^{group} = \begin{cases} \lceil N_g (N_{RB}^{DL}/8) \rceil & \text{for normal cyclic prefix} \\ 2 \cdot \lceil N_g (N_{RB}^{DL}/8) \rceil & \text{for extended cyclic prefix} \end{cases}$$

[Equation 2]

where $N_g \in \{1/6, 1/2, 1, 2\}$ is provided by a higher layer and $N^{DL}_{RB}$ denotes the number of Resource Blocks (RBs) of a DL band. A PHICH group index $n^{group}_{PHICH}$ has a value from 0 to $N^{group}_{PHICH} - 1$.

In a TDD frame shown in FIG. 2(b), the number of PHICH groups may vary with a DL subframe and is given as $m_i \cdot N^{group}_{PHICH}$. Table 9 shows $m_i$.

TABLE 9

| TDD UL-DL configuration | Subframe number i | | | | | | | | | |
|---|---|---|---|---|---|---|---|---|---|---|
| | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

A PHICH group index $n^{group}_{PHICH}$ in a subframe including a PHICH resource has a value from 0 to $m_i \cdot N^{group}_{PHICH} - 1$.

Table 10 shows a mapping relationship between a sequence index $n^{seq}_{PHICH}$ of Equation 1 and a spread sequence $[w(0) \cdots w(N^{PHICH}_{SF} - 1)]$.

TABLE 10

| Sequence index | Orthogonal sequence | |
|---|---|---|
| | Normal cyclic prefix $N^{PHICH}_{SF} = 4$ | Extended cyclic prefix $N^{PHICH}_{SF} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 −1] | [+j −j] |
| 4 | [+j +j +j +j] | — |
| 5 | [+j −j +j −j] | — |
| 6 | [+j +j −j −j] | — |
| 7 | [+j −j −j +j] | — |

In Equation 1, $n_{DMRS}$ is mapped from, for example, a cyclic shift value for a DMRS included in a latest PDCCH having a UL DCI format.

Table 11 shows mapping of $n_{DMRS}$ and a cyclic shift value in a DMRS field.

TABLE 11

| Cyclic Shift for DMRS Field in PDCCH with UL DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

A piggyback PHICH may be transmitted by the BS to a corresponding UE in an available DL subframe, using a DeModulation Reference Signal (DMRS) bit (e.g. 3 bits) included in a DCI format for a UL grant (hereinafter, a UL DCI format) while maintaining orthogonality with a PHICH to be originally transmitted in the available DL subframe. That is, the BS may signal $n_{DMRS}$ for causing a piggyback PHICH not to collide with other PHICHs to be originally transmitted in a corresponding DL subframe to a corresponding UE as $n_{DMRS}$ for the piggyback PHICH.

Alternatively, an additional parameter $n_{SRSS}$ may be introduced so that a PHICH resource of a piggyback PHICH may not collide with other PHICH resources for a corresponding UE in an available DL subframe. $n_{SRSS}$ is a value signaled by the BS to the UE separately from $n_{DMRS}$ and may be provided to the UE together with configuration information of a USRSS or separately from $n_{DMRS}$. If a USRSS for the UE is configured, the UE may detect/receive a PHICH, which has not been received in the USRSS, using $n_{SRSS}$ in a next available DL subframe. For example, a piggyback PHICH group and sequence index may be generated or determined according to the following equation in the available DL subframe.

$$n_{PHICH}^{group}=(I_{PRB\_RA}^{lowest\_index}+n_{DMRS}+n_{SRSS}) \bmod N_{PHICH}^{group}+I_{PHICH}N_{PHICH}^{group}$$

$$n_{PHICH}^{seq}=(\lfloor I_{PRB\_RA}^{lowest\_index}/N_{PHICH}^{group}\rfloor+n_{DMRS}+n_{SRSS}) \bmod 2N_{SF}^{PHICH} \quad \text{[Equation 3]}$$

In Equation 3, parameters except for $n_{sRss}$ have the same meaning as parameters of Equation 1. For example, $n_{SRSS}$ may be defined as shown in the following table.

TABLE 12

| USRSS configuration | $n_{SRSS}$ |
|---|---|
| Not configured | 0 |
| Configured | 1 |

Figure 9:
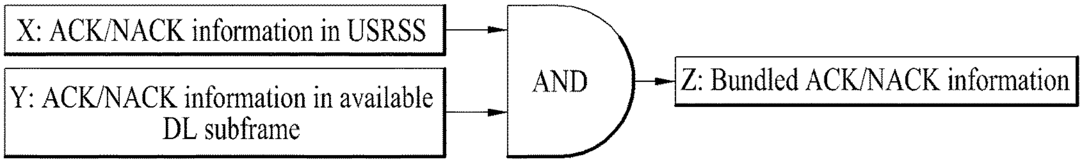
FIG. 9 is a view explaining an ACKnowledgement (ACK)/Negative ACK (NACK) bundling scheme.

(3). It is possible to transmit ACK/NACK information by bundling the dropped ACK/NACK information with ACK/NACK information having a different transmission timing. FIG. 9 is a view explaining an ACK/NACK bundling scheme. In the above-described embodiments related to piggyback PHICH transmission, ACK/NACK information of a PHICH dropped in the USRSS is transmitted on a PHICH different from a PHICH carrying ACK/NACK information for other PUSCH transmission caused by a corresponding UE or other UEs. Unlike this case, referring to FIG. 9, ACK/NACK information (X) of a PHICH dropped in a USRSS may be bundled with ACK/NACK information (Y) for another PUSCH transmitted by a UE and the bundled ACK/NACK information (Z) may be transmitted/received on one PHICH at an ACK/NACK transmission timing for the another PUSCH. Bundling refers to a logical AND operation and bundled ACK/NACK information may be encoded using an AND gate of a bit unit.

Referring to FIG. 8, if a transmission timing of ACK/NACK information for a PUSCH transmitted by a UE targeted for the USRSS, i.e. by UE1 of FIG. 7(*a*) or FIG. 7(*b*), is subframe #3 or #8, the BS A does not transmit a PHICH carrying the ACK/NACK information at the transmission timing. Instead, the BS A transmits the ACK/NACK information in a next available DL subframe on a PHICH independent of other PHICHs according to any one of the above-described embodiments (1) to (3) associated with PHICH piggyback or transmits the ACK/NACK information on the PHICH by performing bundling with other ACK/NACK information. UE1 is aware that specific DL transmission therefor will be restricted in subframes #3 and 8 by receiving USRSS configuration. Accordingly, UE1 may not attempt to detect the PHICH in subframes #3 and #8 according to the USRSS configuration information. Instead, UE1 may detect or receive a PHICH, which should have been received in subframes #3 and #8, in a specific DL subframe other than subframes #3 and #8 configured as USRSs.

If a UE is not a target UE for a USRSS, a BS and a UE may not apply the embodiments of the present invention related to the aforementioned USRSS. For example, assuming that UE0 of FIG. 7(*a*) or 7(*b*) is scarcely subjected to interference from a neighboring cell in a collision subframe, the BS A does not drop a PHICH for UE0 in subframes #3 and #8 and may transmit the PHICH. UE0 may receive the PHICH even in a collision subframe unless UE0 receives USRSS configuration information therefor.

According to the embodiments of the present invention related to the USRSS, the reliability of DL transmission of a corresponding cell can be guaranteed even through a UL time duration of a neighboring cell collides with a DL time duration of a corresponding cell. Especially, since a PHICH carrying important control information for communication between a BS and a UE is prevented from being transmitted in a duration during which UL transmission of a neighboring cell creates interference, the BS can stably transmit the PHICH to the UE.

The PHICH is transmitted in subframe belonging to a CSRSS, whereas PHICH transmission is dropped in a subframe belonging to a USRSS of the present invention. Notably, a PBCH, PSS/SSS, SIB1, paging message, etc., which are indispensable when the UE initially accesses a network and establishes synchronization, may be transmitted/received even in a subframe belonging to the USRSS of the present invention.

According to the USRSS of the present invention, reduction of DL throughout is decreased and a DL signal located at a cell edge can be protected from interference caused by a UL signal of a neighboring cell.

<Blocking Transmission Subframe Set>

Hereinbelow, a blocking transmission subframe, which is another ICI mitigation/cancellation scheme of the present invention, will be described. The above-described USRSS eliminates interference caused by UL transmission in a neighboring cell in such a manner that a BS of a victim cell restricts DL transmission in a subframe in which strong interference from UL transmission of the neighboring cell is present. Meanwhile, according to a Blocking Transmission Subframe Set (BTSS), which will be described below, if UL transmission of a specific cell creates strong interference with respect to DL transmission of a neighboring cell or is subjected to strong interference by DL transmission of the neighboring cell, a BS of the specific cell restricts corresponding UL transmission. That is, referring to FIG. 7(*a*) or 7(*b*), the BS B drops or transmits at weak power UL transmission ③ of the UE, which creates strong interference to the cell A, in a subframe belonging to a BTSS so that interference caused by the UL transmission ③ with respect to DL transmission ④ of the BS A may be mitigated. In addition, since UL transmission of a specific cell affecting strong interference with respect to DL transmission of a neighboring cell is subjected to strong interference by DL transmission of the neighboring cell, if a UL signal is dropped in a subframe belonging to a BTSS according to the present invention, interference caused by DL transmission of the neighboring cell can be minimized.

The BTSS may be configured cell-specifically, UE-specifically, or UE-group-specifically. For convenience of description, a UE or a UE group will be referred to as a UE hereinbelow. Accordingly, even if the term “UE” is changed to “UE group” in the following description, the embodiments of the present invention are identically applicable.

The BRSS proposed in the present invention has the following Characteristics 1, 2, and/or 3.

Characteristic 1: A UE does not perform new transmission in a subframe in a BTSS (hereinafter, BTS).

PUSCH transmission of a UE occurs after a predefined time period based on a subframe in which the UE receives a UL grant. Upon detecting a PDCCH carrying the UL grant in a DL subframe n, the UE may perform PUSCH transmission in a subframe $n+k_{PUSCH}$ according to $k_{PUSCH}$ given in Table 13. In FDD, $k_{PUSCH}$ is 4 and, in TDD, $k_{PUSCH}$ may be given as shown in Table 13.

TABLE 13

| TDD DL-UL | DL subframe number n | | | | | | | | | |
|---|---|---|---|---|---|---|---|---|---|---|
| configuration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

A BS of the present invention adjusts a transmission timing of a UL grant for scheduling new transmission among PDCCH DCI formats for the UE so that the UE may not perform new transmission in a BTS belonging to a corresponding BTSS. That is, the BS transmits a UL grant in a subframe n satisfying the condition that a subframe $n+k_{PHICH}$ does not belong to the BTSS.

Characteristic 2: HARQ retransmission is not configured in a subframe in a BTSS.

According to a 3GPP LTE(-A) system, up to now, upon receiving NACK through a PHICH, the UE retransmits UL data transmitted through a PUSCH associated with the PHICH after a prescribed time period in a subframe in which the PHICH is received. However, according to the present invention, if a retransmission timing of the UL data collides with a BTS, the UE drops retransmission.

Characteristic 3: UCI transmission, such as ACK/NACK report, Channel State Information (CSI) report, and Sounding Reference Signal (SRS) transmission, is dropped in a subframe in a BTSS.

If an ACK/NACK transmission timing, a CSI transmission timing, or an SRS transmission timing, for DL data transmission, collides with a BTS, UCI transmission is dropped. CSI refers to information about a DL channel such as a Channel Quality Indicator (CQI), a Precoding Matrix Indicator (PMI), and a rank indicator. An SRS refers to a reference signal transmitted by a UE to a BS so that the BS may obtain UL channel information. A transmission timing of ACK/NACK information for DL transmission corresponds to a timing after a prescribed number of subframes starting from a subframe in which DL transmission is received. For example, in FDD, ACK/NACK information for DL transmission received in subframe n is transmitted in subframe n+4. In TDD, a ratio of DL subframes to UL subframes may be M:1 according to TDD configuration. M is the number of DL subframes corresponding to one UL subframe. In this case, the UE should transmit, in one UL subframe, ACK/NACK responses to plural PDSCHs in M DL subframes. ACK/NACK information transmitted in UL subframe n corresponds to a PDCCH(s) and a DL SPS release PDCCH, detected by the UE in a DL subframe(s) n−k (k∈K). K is given by a UL-DL configuration. Table 14 shows K: $\{k_0, k_1, \ldots, k_{M-1}\}$ defined in 3GPP LTE(-A).

TABLE 14

| DL-UL Config- | Subframe n | | | | | | | | | |
|---|---|---|---|---|---|---|---|---|---|---|
| uration | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | — | 7 | — |

An aperiodic CSI transmission timing may be a subframe located after a prescribed number of subframes starting from a subframe in which the BS requests CSI report. A periodic CSI transmission timing may be determined according to CSI configuration information provided by the BS to the UE through higher layer signaling. An SRS transmission timing may be configured according to SRS configuration information provided by the BS to the UE through higher layer signaling. Since the BS knows the ACK/NACK information transmission timing, a CSI transmission timing, and an SRS transmission timing, if a BTSS is configured for the UE and a STS in the BTSS collides with a UCI transmission timing, it can be appreciated that the specific UE will drop transmission of the UCI. Accordingly, the BS may not detect/receive a PUCCH and/or an SRS from the UE in the BTS.

If a BS allocates the BTSS for a UE(s), the BS may direct the UE(s) to perform Characteristic 1 to Characteristic 3 of the above-described BTSS using RRC parameters or some bits in DCI of a PDCCH. The BS may also transmit configuration information of the BTSS to the UE(s) and the configuration information may include a bitmap indicating the location of a subframe configured as the BTS among subframes corresponding to the period of a BTSS pattern. For example, the bitmap of Table 15 or Table 16 may be used to indicate the location of the BTS in the BTS pattern period.

TABLE 15

| | Subframe Number | | | | | | | | | | | | | | | | | | | |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 |
| BTS allocation | 0 | 0 | 0 | 1 | 0 | 0 | 0 | 0 | 0 | 0 | 0 | 0 | 0 | 0 | 0 | 0 | 0 | 0 | 0 | 0 |

TABLE 16

| Collision Subframe Number | 3 | 13 |
| --- | --- | --- |
| BTS allocation | 1 | 0 |

In Table 15 and Table 16, it is assumed that a BTSS is allocated at a 20 ms pattern, subframes #3 and #13 are collision subframes, and subframe #3 is configured as a BTS. In Table 15 and Table 16, a subframe corresponding to a bit set to '1' is a BTS and a subframe corresponding to a bit set to '0' is a normal subframe. Conversely, '1' may be defined to indicate the normal subframe and '0' may be defined to indicate the BTS. Table 15 shows a method of signaling the location of the BTS in a BTSS pattern, using a bitmap including 20 bits in one-to-one correspondence with all subframes corresponding to the pattern period of the BTSS. Table 16 shows a method of signaling the location of the BTS in the BTSS pattern, using a bitmap including a bit(s) corresponding one by one to a collision subframe(s) rather than all subframes in the BTSS pattern. Methods other than the methods shown in Table 15 and Table 16 may be used to signal the location of the BTS. For example, since the UE is aware of the TDD DL-UL configuration of a BS accessed thereby, the UE may also be aware of DL subframes among subframes corresponding to the BTSS pattern period. Accordingly, the BS may signal a subframe corresponding to the BTS to the UE, using the bitmap including bits corresponding one by one to UL subframes in the BTSS pattern period.

In the present invention, the BTSS may be cell-specifically configured or may be UE-specifically or UE-group-specifically configured. If the BTSS is configured UE-specifically or UE-group specifically, all time durations in which communication links of an opposite direction are formed in neighboring cells, i.e. all collision subframes, need not all be BTSs for a specific UE. The collision subframe may become a BTS. However, even when the UE is subjected to strong interference in a collision subframe, if the UE is subjected to only slight interference in other collision subframe, the BS may configuring only the collision subframe experiencing strong interference as a BTS and may signal configuration of the BTS to the UE. If there are another UE causing strong interference with respect to a neighboring cell in another collisions subframe, the BS configures the above another collision subframe as a BTS for the above another UE and may signal configuration of the BTS to the above another UE.

The UE receives configuration information about a BTSS and may restrict UL transmission in the BTS according to the configuration information. For example, the UE may not transmit new UL data in a subframe indicated as the BTS. If a transmission timing of UL data at which retransmission is demanded by the BS is a BTS, the UL data, retransmission of which is demanded, may not be transmitted in the BTS. If a transmission timing of a PUCCH carrying ACK/NACK information (hereinafter, ACK/NACK PUCCH) is a BTS, the ACK/NACK PUCCH may be dropped in the BTS. If a transmission timing of a PUCCH carrying CSI (hereinafter, CSI PUCCH) is a BTS, the CSI PUCCH may be dropped in the BTS.

If the BTSS is configured and operations of Characteristic 1 to Characteristic 3 of the aforementioned BTSS are directed to be performed in the BTSS, the UE may drop the above-described UL signal in a UL subframe corresponding to the BTS and transmit the dropped UL signal in a UL subframe after a prescribed time period. The UL subframe in which the UL signal dropped in the BTS is transmitted may be determined according to one of the following embodiments.

Figure 10:
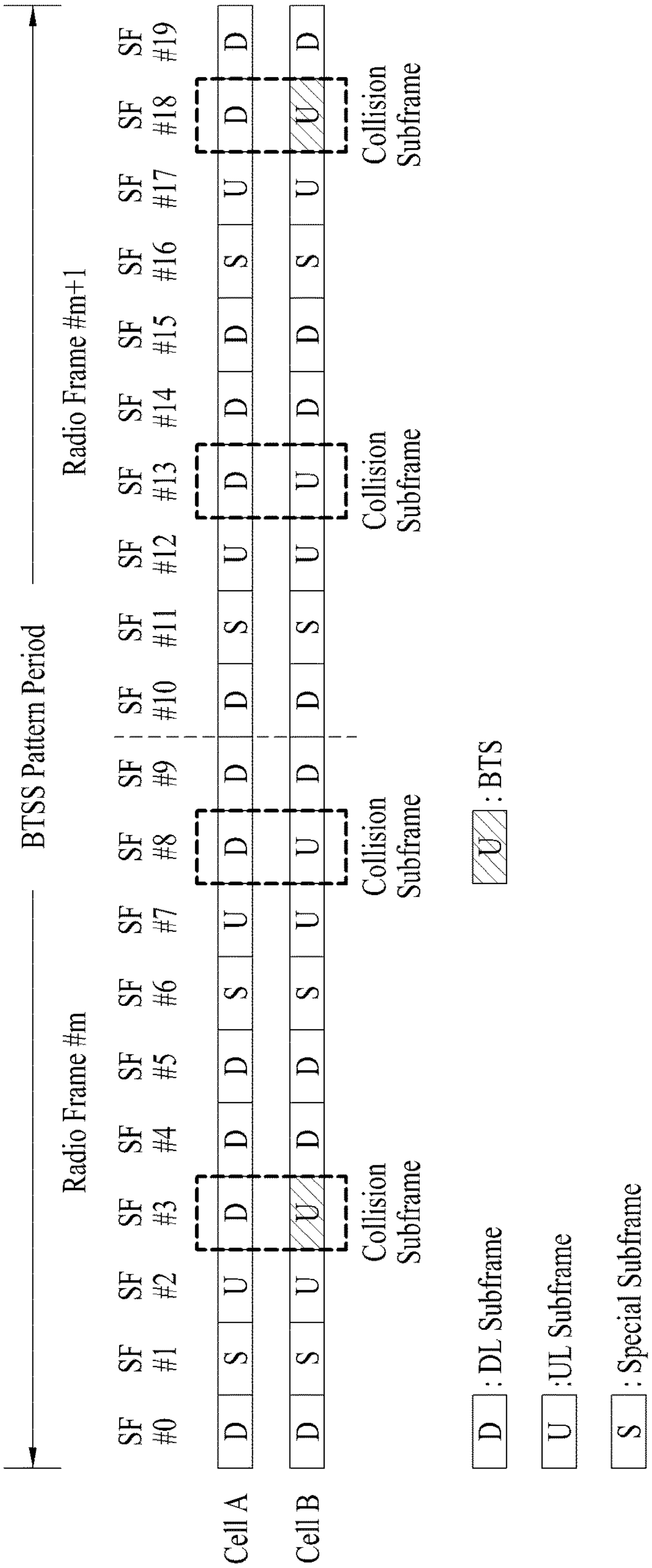
FIG. 10 illustrates an exemplary method for canceling ICI using a Blocking Transmission Subframe Set (BTSS)

FIG. 10 illustrates an exemplary method for canceling ICI using a BTSS. Specifically, it is assumed in FIG. 10 that the BS A of FIG. 7(*a*) or FIG. 7(*b*) configures a radio frame according to TDD DL-UL configuration #2 of Table 1 and the BS B configures a radio frame according to TDD DL-UL configuration #1 of Table 1. In this case, if a BTSS pattern period is 20 ms and subframes in the corresponding pattern period are numbered 0 to 19, the BS B and BS A form radio communication links in an opposite direction in subframes #3, #8, #13, and #18.

Referring to FIG. 10, in subframes #3, #8, #13, and #18, the BS A operates in DL and the BS B operates in UL. Therefore, DL transmission transmitted to a UE(s) located in a cell B, to which the BS B provides a communication service, may be subjected to interference by UL transmission caused by a UE(s) located in a cell A, to which the BS A provides a communication service. Alternatively, UL transmission of the cell A may be subjected to interference by DL transmission of the cell B. The BS A may configure a UL subframe, in which a UE(s) of the cell B is subjected to strong interference by DL transmission of the cell A or strong interference is generated with respect to DL transmission of the cell A, as a BTSS including a BTS and transmit configuration information for the BTSS to a corresponding UE(s). For example, the BS B may transmit the bitmap configured as shown in Table 17 to the corresponding UE(s) according to the embodiments of Table 15 or may transmit the bitmap configured as shown in Table 18 to the corresponding UE(s) according to the embodiment of Table 16.

TABLE 17

| | Subframe Number | | | | | | | | | | | | | | | | | | | |
| --- | --- | --- | --- | --- | --- | --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 | 14 | 15 | 16 | 17 | 18 | 19 |
| USRS allocation | 0 | 0 | 0 | 1 | 0 | 0 | 0 | 0 | 0 | 0 | 0 | 0 | 0 | 0 | 0 | 0 | 0 | 0 | 1 | 0 |

TABLE 18

| Collision Subframe Number | 3 | 8 | 13 | 18 |
| --- | --- | --- | --- | --- |
| USRS allocation | 1 | 0 | 0 | 1 |

In Tables 17 and 18, '1' indicates that a corresponding subframe is a BTS and '0'indicates that a corresponding subframe is a normal subframe rather than the BTS.

Notably, if BTS configuration information is transmitted as shown in Table 18, since it is difficult for a UE(s) connected to the BS B to know which TDD DL-UL configuration the BS A includes, the BS B preferably transmits information about the TDD DL-UL configuration of the BS A or information about collision subframes to the UE(s) separately or together.

If a transmission timing of a UL signal overlaps with a BTSS duration and, as a result, the UL signal is dropped, the dropped UL signal may be transmitted/received in a next available UL subframe after the transmission timing. Embodiments for transmitting/receiving the UL signal dropped in the BTS will be described with reference to FIG. 11 to FIG. 13.

Figure 11:
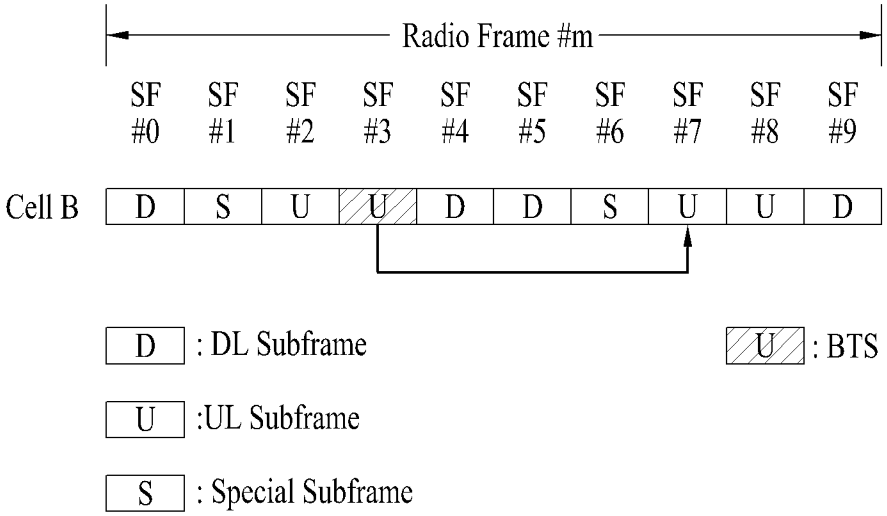
FIG. 11 illustrates an exemplary embodiment for transmitting/receiving a dropped UL signal according to the present invention.

FIG. 11 illustrates an exemplary embodiment for transmitting/receiving a dropped UL signal according to the present invention. In FIG. 11, it is assumed that subframe #3 of a cell B operating in TDD DL-UL configuration #1 of Table 1 is configured as a BTS. It is also assumed that cell A adjacent to the cell B operates as DL in subframes #3 and #8 in which the cell B operates as UL.

In the embodiment of FIG. 11, a UL signal dropped in a BTS is transmitted/received in the first UL subframe after the BTS. In this case, if the first UL subframe is the BTS, since the dropped UL signal cannot be transmitted/received in the first UL subframe, the first UL subframe should not belong to the BTSS. Referring to FIG. 11, the UL signal dropped in subframe #3 configured as the BTS may be transmitted/received in subframe #7 which is the first subframe among UL subframes of non-BTSs after subframe #3. Since a BS B and a UE connected to the BS B know the TDD DL-UL configuration of the cell B and a BTSS configuration, the BS B and the UE also know the first normal UL subframe after the BTS in which the UE drops the UL signal. The BS of the cell B (hereinafter BS B) may explicitly transmit information indicating the above first subframe to the UE.

Meanwhile, the UL subframe in which the UL signal dropped in the BTS is transmitted may be the first non-collision subframe after the BTS. Referring back to FIG. 11, the UL signal dropped in subframe #3 configured as the BTS may be transmitted/received in the first subframe among UL subframes other than collision subframes, i.e. among non-collision UL subframes, after subframe #3. The BS B may share information about the TDD DL-UL configuration with the BS A. The BS B may explicitly or implicitly transmit information indicating the first non-collision subframe to the UE. For example, if the BS B transmits information about the TDD DL-UL configuration of the cell A to the UE, the UE may be aware of a subframe forming a radio communication link in an opposite direction between the cell A and cell B by comparing the TDD DL-UL configuration of the cell B with the TDD DL-UL configuration of cell A. As another example, the BS B may explicitly transmit information indicating subframes #3 and #8, which are subframes forming radio communication links in an opposite direction between the cell A and cell B. If collision subframes forming a radio communication link in an opposite direction between neighboring cells is known, the UE may recognize that, in FIG. 11, subframe #7 is the first non-collision subframe after the BTS in which UL transmission is dropped.

Figure 12:
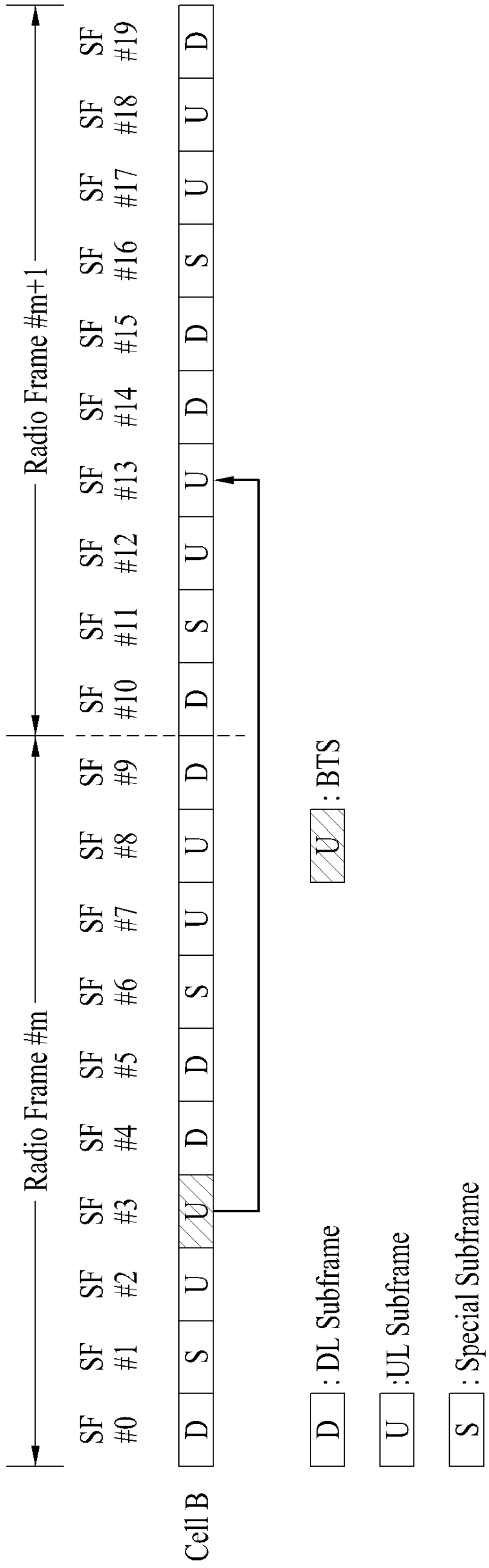
FIG. 12 illustrates another exemplary embodiment for transmitting/receiving a dropped UL signal according to the present invention.

FIG. 12 illustrates another exemplary embodiment for transmitting/receiving a dropped UL signal according to the present invention. In FIG. 12, it is assumed that a BTSS pattern period is 20 ms and subframe #3 of a cell B operating in TDD DL-UL configuration #1 of Table 1 is configured as a BTS. It is also assumed that a cell A adjacent to the cell B operates as DL in subframes #3, #8, #13, and #18 in which the cell B operates as UL.

In the embodiment of FIG. 12, a UL signal dropped in the BTS is transmitted/received in a UL subframe of the same location in a radio frame after a radio frame including the BTS. That is, according to the embodiment of FIG. 12, if the number of subframes in a radio frame is $N_{subframe}$, the dropped UL signal is transmitted/received in a subframe of a next radio frame, capable of obtaining the same value when modulo-$N_{subframe}$ is applied to a subframe number. In other words, according to the embodiment of FIG. 12, a UL signal dropped in an i-th subframe of radio frame #m is transmitted/received in an i-th subframe of a radio frame #m+1. Referring to FIG. 12, a UL signal dropped in subframe #3 configured as the BTS in radio frame #m may be transmitted/received in subframe #13 of radio frame #m+1.

Figure 13:
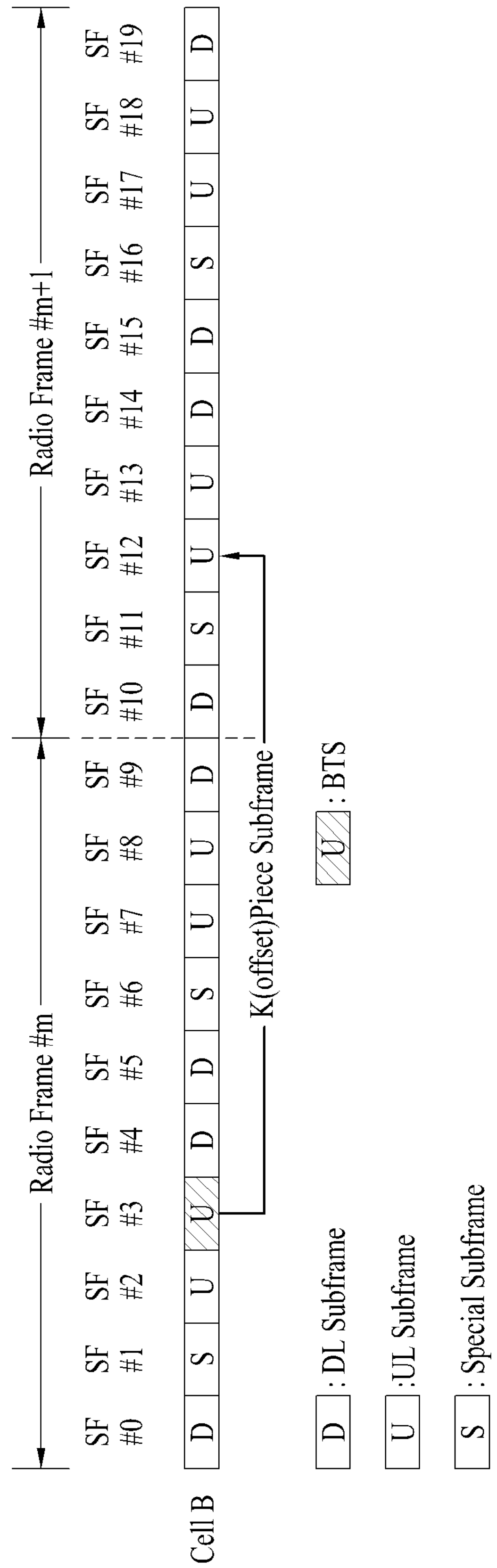
FIG. 13 illustrates still another exemplary embodiment for transmitting/receiving a dropped UL signal according to the present invention.

FIG. 13 illustrates still another exemplary embodiment for transmitting/receiving a dropped UL signal according to the present invention. In FIG. 13, it is assumed that a BTSS pattern period is 20 ms and subframe #3 of a cell B operating in TDD DL-UL configuration #1 of Table 1 is configured as a BTS. It is also assumed that a cell A adjacent to the cell B operates as DL in subframes #3, #8, #13, and #18 in which the cell B operates as UL.

In the embodiment of FIG. 13, a UL signal dropped in a BTS is transmitted/received using a predetermined offset K. That is, the UL signal dropped in the BTS may be transmitted/received in a UL subframe after the predetermined offset K, predetermined or indicated by higher layer signaling from a BS. Referring to FIG. 13, if the offset K which is predetermined or signaled to the UE by the BS A is 9, a UL signal dropped in subframe #3 configured as the BTS is transmitted in a subframe #(3+K) subframe #(3+9)=subframe #12). Since the BS A is aware of the offset K, the BS A knows in which subframe, instead of the BTS, the UL signal dropped in the BTS should be transmitted. Accordingly, the BS A may detect or receive the UL signal, a transmission timing of which is subframe #3, in subframe #12.

Among UL signals defined to be dropped in the BTS, ACK/NACK information carried by an ACK/NACK PUCCH and/or UL data carried by a PUSCH according to retransmission demand may be UL signals which should be transmitted in a UL subframe determined according to any one of the embodiments of FIG. 11 to FIG. 13. In addition, an SRS and/or a CSI PUCCH may also be UL signals which should be transmitted in a UL subframe determined according to any one of the embodiments of FIG. 11 to FIG. 13. However, since an SRS and/or a CSI PUCCH which have been dropped in the BTS only need to be transmitted/received in a UL subframe corresponding to a next period, the embodiments of FIG. 11 to FIG. 13 may not be applied to the SRS and/or CSI PUCCH.

The embodiments of the present invention related to the BTSS has been described hereinabove by taking an example of the case in which a BS of one cell configures the BTSS when cells performing ICIC have different TDD DL-UL configurations. However, it is possible for a BS operating in FDD or a BS having the same TDD DL-UL configuration as a neighboring cell to configure the above BTSS and transmit configuration information of the BTSS to a UE of a corresponding cell. In FDD or in the case in which neighboring cells have the same TDD DL-UL configuration, a UE receiving the BTSS configuration information may restrict UL transmission in a subframe belonging to the BTSS according to the above-described Characteristic 1 to Characteristic 3 of the BTSS.

Figure 14:
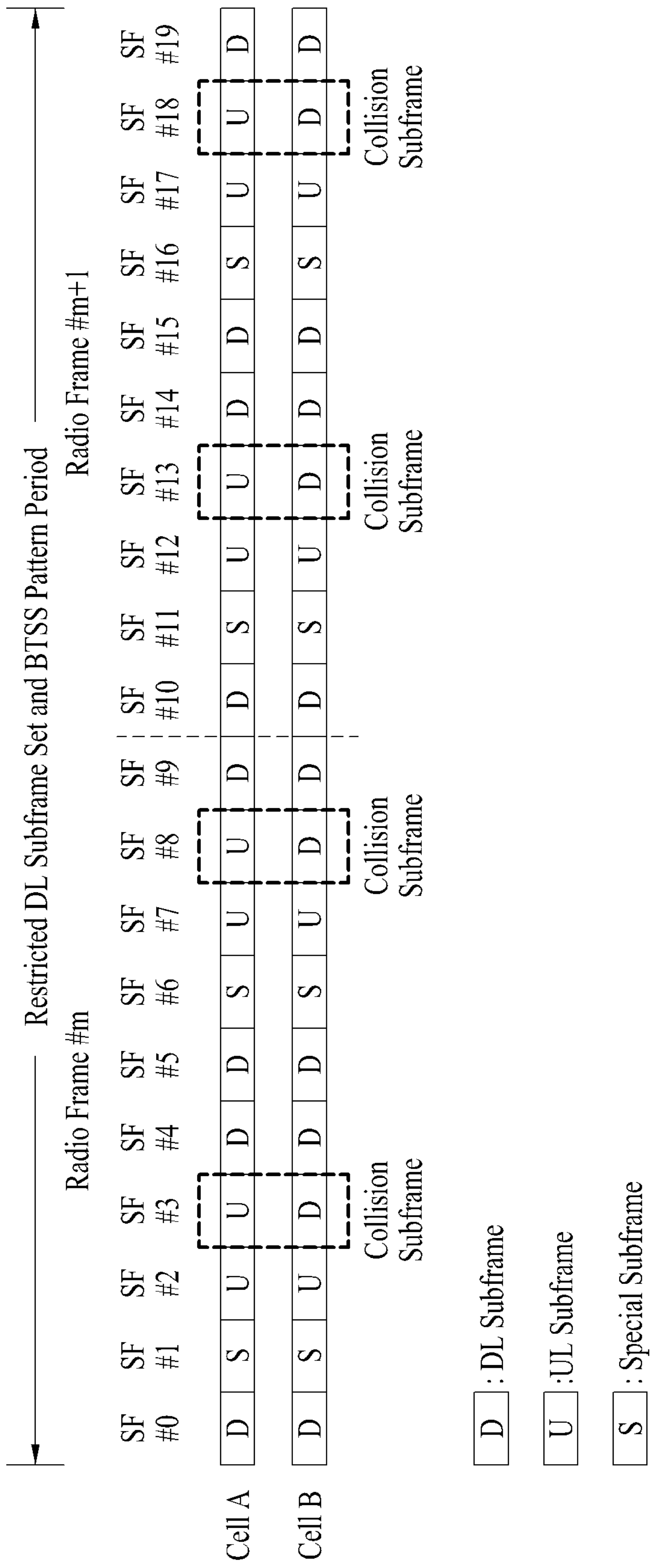
FIG. 14 and FIG. 15 illustrate an exemplary method for cancelling ICI using a Cell-Specific Restricted DL Subframe Set (CSRSS) or UE-Specific Restricted DL Subframe Set (USRSS) and a Blocking Transmission Subframe Set (BTSS).
Figure 15:
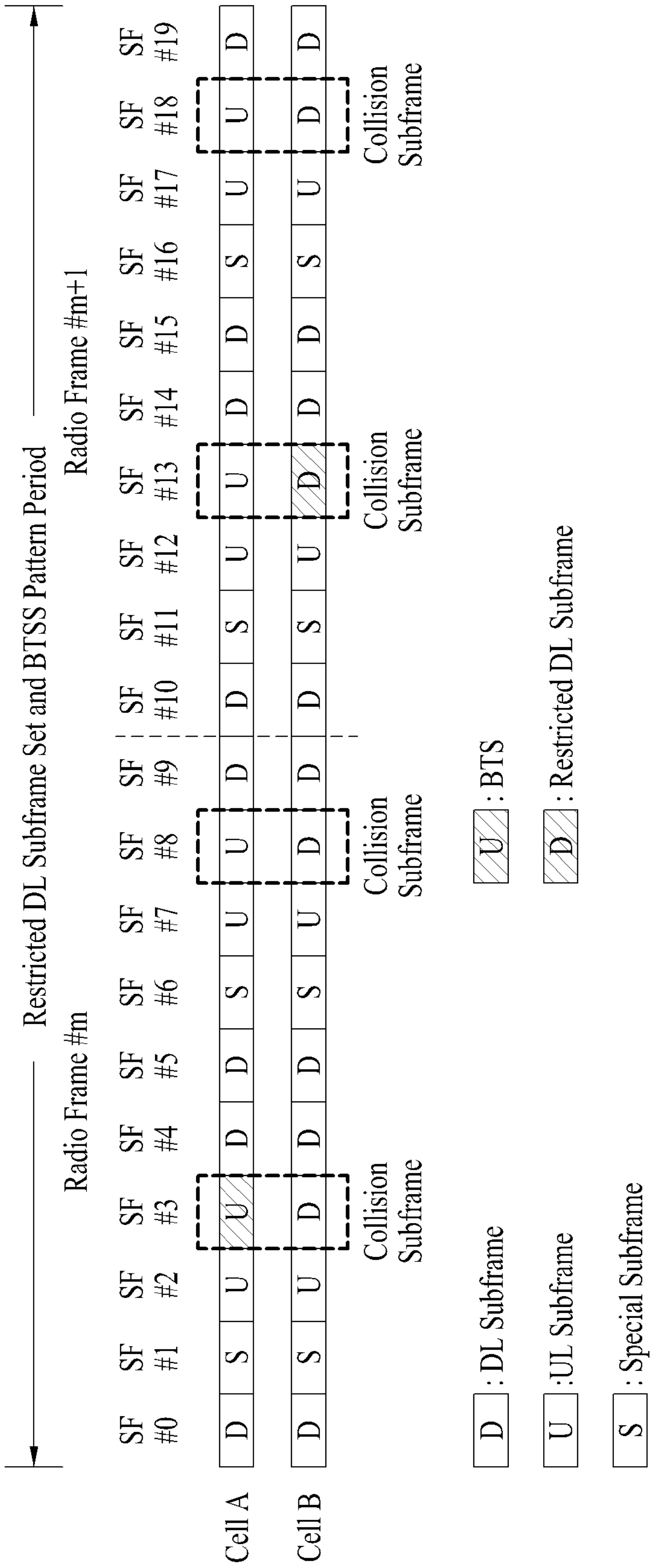

The BTSS of the present invention may be used together with a CSRSS or a USRSS. FIG. 14 and FIG. 15 illustrate an exemplary method for cancelling ICI using a CSRSS or USRSS and a BTSS. Specifically, in FIG. 14 and FIG. 15, it is assumed that the BS A of FIG. 7(*a*) or FIG. 7(*b*) configures a radio frame according to TDD DL-UL configuration #1 of Table 1 and the BS B configures a radio frame according to TDD DL-UL configuration #2 of Table 1.

Referring to FIG. 14, if a cell-specific or UE-specific restricted DL subframe set (hereinafter, a restricted DL subframe set), a BTSS pattern period is 20 ms, and subframes in a corresponding pattern period are numbered 0 to 19, a BS B and a BS A form radio communication links in an opposite direction in subframes #3, #8, #13, and #18. Accordingly, UL transmission of the BS A in subframes #3, #8, #13, and #18, which are collision subframes, is influenced by interference caused by DL transmission of the BS B. Such interference may be more serious when the BS B and BS A are a micro BS and a macro BS, respectively and the BS A is adjacent to the BS. Moreover, affect of interference may be different according to load of a DL signal of the micro BS and the number of macro-UEs scheduled in the collision subframes. The BS A may reduce influence of interference caused by UL transmission of the BS A by allocating only a subframe(s), which creates strong interference with respect to DL transmission of another cell or is subjected to strong interference among subframes #3, #8, #13, and #18 in which the BS B operates as UL, to the BTSS. The BS B may reduce influence of interference caused by DL transmission of the BS by allocating only a subframe(s), which creates strong interference with respect to UL transmission of another cell among subframes #3, #8, #13, and #18 in which the BS B operates as DL, to the restricted DL subframe set. Then, loss of cell throughput generated due to interference between cells operating in different TDD DL-UL configurations can be avoided.

Referring to FIG. 15, a BS A configures subframe #3 among collision subframes in radio frame #m as a BTS, thereby cancelling interference coming from a cell A or interference to the cell A. The BS A may transmit configuration information about a BTSS to a UE(s) in the cell A. In radio frame #m+1, a BS B configures subframe #13 among collision subframes as a restricted DL subframe (i.e. a CSRS or USRS), thereby protecting UL signal transmission by a UE(s) connected to the BS A. The BS B may transmit configuration information about the CSRSS or USRSS to the UE(s) in a cell B.

Although an example in which one BS configures either CSRSS/USRSS or BTSS has been described in FIG. 15, it is possible for one BS to configure both the CSRSS and the BTSS or both the USRSS and the BTSS. In this case, the BS may transmit a bitmap, in which a subframe configured as a CSRS or a USRS and a subframe configured as a BTS among subframes corresponding to the pattern periods of the CSRSS and BTSS or the pattern periods of the USRSS and BTSS are set to 1, to the UE. The UE may determine a DL subframe which is set to 1 among subframes corresponding to each bit of the bitmap as the CSRS or USRS, determine a UL subframe which is set to 1 as the BTS, and determine a UL or DL subframe which is set to 0 as a normal subframe.

Meanwhile, in order for the BS to allocate and operate the CSRSS or USRSS, and/or the BTSS, configuration information about the CSRSS or USRSS, and/or BTSS is exchanged between BSs. For example, the configuration information described in Table 5 to Table 8, and/or Table 15 and Table 16 may be exchanged between BSs for performing ICI mitigation/cancellation.

The above CSRSS/USRSS comprised of a DL transmission restricted subframe(s) and/or the BTSS comprised of a DL transmission restricted subframe(s) are a subset of all subframes. Accordingly, subframes belonging to the CSRSS/USRSS and/or BTSS can be a subframe subset. If a plurality of subframe subsets is configured, one of the plural subframe subsets may be configured to have the same pattern as a subframe subset pattern for a victim cell or a subframe subset pattern for an aggressor cell. However, the patterns need not always be the same. Each subframe subset may be configured without any common subframe or may be configured to have a prescribed number of common subframes. The sum of subframes included in two subframe subsets may be equal to total subframes or may be a subset of total subframes. The BS may signal one or more subframe subsets to a UE located in a corresponding cell according to any one of the above-described embodiments.

Figure 16:
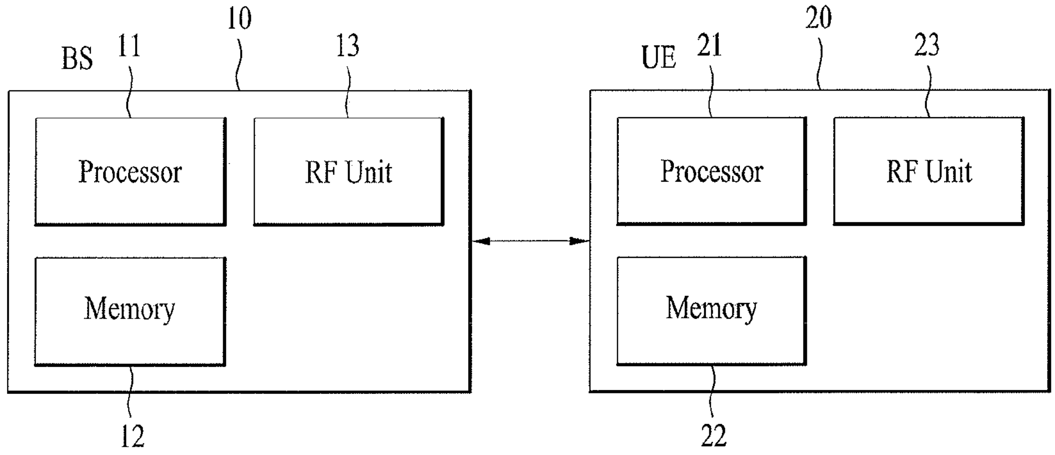
FIG. 16 is a block diagram illustrating elements of a Base Station (BS) and a User Equipment (UE) by which the present invention is performed.

FIG. 16 is a block diagram illustrating elements of a BS 10 and a UE 20 by which the present invention is performed.

In the above-described methods of the present invention, the BS 10 may be a transmission entity of CSRSS configuration information, USRSS configuration information, and BTSS configuration information and the UE 20 may be a reception entity of CSRSS configuration information, USRSS configuration information, and BTSS configuration information. The BS may be a transmission entity of a DL signal described in the above embodiments and a reception entity of a UL signal described in the above embodiments. The UE 20 may be a transmission entity of a UL signal described in the above embodiments and a reception entity of a DL signal described in the above embodiments.

The BS 10 and the UE 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 control the overall operation of various modules in the BS or UE. The processors 11 and 21 may perform various control functions to perform the present invention. The processors 11 and 21 may be referred to as controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the BS codes and modulates signals and/or data scheduled by the processor 11 or a scheduler connected to the processor 11 to be transmitted to the exterior. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Medium Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the UE 20 is the reverse of the signal processing process of the BS 10. Under control of the processor 21, the RF unit 23 of the UE 10 receives radio signals transmitted by the BS 10. The RF unit 23 may include $N_r$ receive antennas and frequency down-converts each signal received through receive antennas into a baseband signal. The processor 21 decodes and demodulates the radio signals received through the receive antennas and restores data that the BS 10 originally desired to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the UE 20. A reference signal transmitted in correspondence to an antenna defines an antenna viewed from the UE 20 and enables the UE 20 to perform channel estimation for the antenna, irrespective of whether a channel is a single radio channel transmitted from one physical channel or a composite channel transmitted from a plurality of physical antennas including the antenna. That is, an antenna is defined such that a channel for transmitting a symbol on the antenna can be derived from the channel through which another symbol on the same antenna is transmitted. An RF unit supporting a Multiple Input Multiple Output (MIMO) function of transmitting and receiving data using a plurality of antennas may be connected to two or more antennas.

The processor 11 of the BS 10 according to the present invention may configure at least one of CSRSS, USRSS, and BTSS. The processor 11 controls the RF unit 13 of the BS 10 so as to transmit configuration information of the CSRSS, USRSS, and/or BTSS to the UE 20 in a service area of the BS 10.

The processor 11 cell-specifically configures the CSRSS and controls the RF unit 13 to transmit configuration of the CSRSS. The processor 11 may configure the CSRSS when the BS 10 and another BS adjacent to the BS 10 operate in FDD mode or have the same or different TDD DL-UL configurations. The processor 11 may configure the CSRSS using a subframe(s) subjected to strong interference among subframes in which DL transmission of the BS 10 collides with DL transmission of another BS. When the processor 11 configures the CSRSS, the processor 11 may control the RF unit 13 to transmit only a specific DL signal(s) in a subframe belonging to the CSRSS and not to transmit the other DL signals except for the specific DL signal. Alternatively, the processor 11 may control the RF unit 13 to transmit the other DL signals, except for the specific DL signals, at low transmission power in a subframe belonging to the CSRSS. Upon receiving configuration information of the CSRSS, the processor 21 of the UE 20 may control the RF unit 23 of the UE 20 to detect or receive only a specific DL signal(s) in the subframe belonging to the CSRSS and not to detect or receive the other signals. For example, a PHICH signal may be the specific DL signal. If a PHICH transmission timing for UL data transmitted to the BS 10 by the UE 20 corresponds to the CSRSS, the processor 21 controls the RF unit 23 to detect/receive the PHICH.

The processor 11 UE-specifically or UE-group-specifically configures the USRSS and controls the RF unit 13 to transmit configuration information of the USRSS to the UE or the UE 20 belonging to the UE-group. The processor 11 may configure the USRSS when the BS 10 and another BS adjacent to the BS 10 have different TDD DL-UL configurations and may configure the BTSS using a subframe(s) subjected to strong interference among subframes in which UL transmission of the UE 20 connected to the BS 10 collides with DL transmission of another BS. Even if the BS 10 and another BS adjacent to the BS 10 operate in FDD mode or have the same TDD DL-UL configuration, the processor 11 may configure the BTSS using a subframe(s) in which UL transmission of the UE 20 connected to the BS 10 collides with UL transmission of the UE connected to another BS to create strong interference between the UEs or in any one of the UEs. If the processor 11 configures the USRSS for the UE 20, the processor 12 may control the RF unit 13 to transmit only a specific DL signal in a subframe belonging to the USRSS and not to transmit the other DL signals except for the specific DL signal or may control the RF unit 13 to transmit the signal at low transmission power. Especially, the processor 12 may drop ACK/NACK transmission when a transmission timing of ACK/NACK transmission corresponds to a subframe belonging to the USRSS. That is, if the transmission timing of a PHICH carrying the ACK/NACK information collides with the USRSS, the processor 11 drops PHICH transmission and does not control the RF unit 13 to transmit the PHICH. The processor 11 may control the RF unit 13 to transmit the dropped ACK/NACK information to the UE 20 in a next available DL subframe. Upon receiving configuration of the USRSS, the processor 21 of the UE 20 may control the RF unit 23 to detect or receive a specific DL signal(s) in a subframe belonging to the USRSS and not to detect or receive the other DL signals. If the transmission timing of ACK/NACK information for UL data transmitted to the BS 10 by the UE 20 corresponds to the USRSS, the processor 21 may control the RF unit 23 not to detect or receive the ACK/NACK information in the transmission timing corresponding to the USRSS. The processor 11 may control the RF unit 13 to detect or receive the ACK/NACK information in the next available DL subframe.

The processor 11 UE-specifically or UE-group-specifically configures the BTSS and controls the RF unit 13 to transmit configuration information of the BTSS to the corresponding UE 20 or the UE 20 connected to the BS 20. The processor 11 may configure the BTSS when the BS 10 and another BS adjacent to the BS 10 have different TDD DL-UL configurations and may configure the BTSS using a subframe(s) subjected to strong interference among subframes in which UL transmission of the UE 20 collides with DL transmission of the another BS. Even if the BS 10 and another BS adjacent to the BS 10 operate in FDD mode or have the same TDD DL-UL configuration, the processor 11 may configure the BTSS using a subframe(s) in which UL transmission of the UE 20 collides with UL transmission of a UE connected to the another BS to create strong interference between the UEs or in any one of the UEs. Upon receiving the configuration information of the BTSS, the processor 21 of the UE 20 may control the RF unit 23 of the UE 20 to drop a prescribed UL signal according to the above-described Characteristic 1 to Characteristic 3 of the BTSS in a subframe belonging to the BTSS or to transmit the prescribed UL signal at low power. That is, the processor 21 may not control the RF unit 23 to transmit a prescribed UL signal in a subframe configured as the BTS or may control the RF unit 23 to transmit the prescribed UL signal at low power. The processor 21 may control the RF unit 23 to transmit a UL signal, which has been dropped in a transmission timing because the transmission timing corresponds to a subframe belonging to the BTSS, in a UL subframe determined according to any one of the embodiments of FIG. 11 to FIG. 13. If the processor 11 configures the BTSS for the specific UE 20 or the UE 20 of a corresponding cell, the processor 11 knows that the corresponding UE 20 will not transmit a prescribed UL signal in a subframe belonging to BTSS. Therefore, the processor 12 may cause the RF unit 13 of the BS 10 not to detect/receive the prescribed UL signal in a subframe belonging to the BTSS. The processor 12 may control the RF unit 13 to receive the prescribed UL signal in a UL subframe determined according to any one of the embodiments of FIG. 11 to FIG. 13.

The detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention is applicable to a BS, a UE, or other equipment in a wireless communication system.

The invention claimed is:

1. A method for receiving, by a user equipment operating in a time division duplex (TDD) mode, acknowledgement/negative acknowledgement (ACK/NACK) information from a base station, the method comprising:

receiving a Downlink-Uplink (DL-UL) configuration of the base station from the base station;

receiving a neighboring DL-UL configuration of a neighboring base station from the base station;

determining one or more collision subframes based on the DL-UL configuration and the neighboring DL-UL configuration, wherein the one or more collision subframes are one or more downlink subframes of the base station corresponding to one or more uplink subframes of the neighboring base station;

receiving, from the base station, an information bitmap indicating at least one restricted subframe of the one or more collision subframes, wherein the information bitmap is specifically configured to the user equipment; and receiving the ACK/NACK information at a first downlink subframe according to the DL-UL configuration, wherein the first downlink subframe is a downlink subframe of the base station other than the at least one restricted subframe, and wherein a physical downlink control channel, a physical downlink shared channel, and a physical hybrid automatic retransmit request indicator channel are restricted to be received at the user equipment in the at least one restricted subframe.

2. The method according to claim 1, wherein the ACK/NACK information is received in an available downlink subframe indicated by the DL-UL configuration after a transmission timing when the transmission timing belongs to the at least one restricted subframe.

3. A method for transmitting, by a base station, acknowledgement/negative acknowledgement (ACK/NACK) information to a user equipment operating in a time division duplex (TDD) mode, the method comprising:

transmitting a Downlink-Uplink (DL-UL) configuration of the base station to the user equipment;

transmitting a neighboring DL-UL configuration of a neighboring base station to the user equipment;

determining one or more collision subframes based on the DL-UL configuration and the neighboring DL-UL configuration, wherein the one or more collision subframes are one or more downlink subframes of the base station corresponding to one or more uplink subframes of the neighboring base station;

transmitting, to the user equipment, an information bitmap indicating at least one restricted subframe of the one or more collision subframes, wherein the information bitmap is specifically configured to the user equipment; and dropping the ACK/NACK information at a transmission timing of the ACK/NACK information when the transmission timing belongs to the at least one restricted subframe, and transmitting the ACK/NACK information at the transmission timing when the transmission timing belongs to a downlink subframe indicated by the DL-UL configuration and does not belong to the at least one restricted subframe, wherein a physical downlink control channel, a physical downlink shared channel, and a physical hybrid automatic retransmit request indicator channel are restricted to be transmitted to the user equipment in the at least one restricted subframe.

4. The method according to claim 3, wherein the DL-UL configuration used in the user equipment is different from the neighboring DL-UL configuration used in the neighboring base station adjacent to the base station.

5. The method according to claim 3, wherein the ACK/NACK information is transmitted in an available downlink subframe indicated by the DL-UL configuration after the transmission timing when the transmission timing belongs to the at least one restricted subframe.

6. A user equipment operating in a time division duplex (TDD) mode, for receiving acknowledgement/negative acknowledgement (ACK/NACK) information from a base station, the user equipment comprising:

a radio frequency (RF) unit configured to transmit and receive a radio signal; and a processor configured to control the RF unit, wherein the processor is further configured to:

control the RF unit to receive a Downlink-Uplink (DL-UL) configuration of the base station from the base station, control the RF unit to receive a neighboring DL-UL configuration of a neighboring base station from the base station, determine one or more collision subframes based on the DL-UL configuration and the neighboring DL-UL configuration, wherein the one or more collision subframes are one or more downlink subframes of the base station corresponding to one or more uplink subframes of the neighboring base station, control the RF unit to receive, from the base station, an information bitmap indicating at least one restricted subframe of the one or more collision subframes, and control the RF unit to receive the ACK/NACK information at a first downlink subframe according to the DL-UL configuration, wherein the information bitmap is specifically configured to the user equipment, wherein the first downlink subframe is a downlink subframe of the base station other than the at least one restricted subframe, and wherein a physical downlink control channel, a physical downlink shared channel, and a physical hybrid automatic retransmit request indicator channel are restricted to be received at the user equipment in the at least one restricted subframe.

7. The user equipment according to claim 6, wherein the DL-UL configuration used in the user equipment is different from the neighboring DL-UL configuration used in the neighboring base station adjacent to the base station.

8. The user equipment according to claim 6, wherein the processor is further configured to control the RF unit to receive the ACK/NACK information in an available downlink subframe indicated by the DL-UL configuration after a transmission timing of the ACK/NACK information when the transmission timing belongs to the at least one restricted subframe.

9. A base station for transmitting acknowledgement/negative acknowledgement (ACK/NACK) information to a user equipment operating in a time division duplex (TDD) mode, the base station comprising:

a radio frequency (RF) unit configured to transmit and receive a radio signal; and a processor configured to control the RF unit, wherein the processor is further configured to:

control the RF unit to transmit a Downlink-Uplink (DL-UL) configuration of the base station to the user equipment, control the RF unit to transmit a neighboring DL-UL configuration of a neighboring base station to the user equipment, determine one or more collision subframes based on the DL-UL configuration and the neighboring DL-UL configuration, wherein the one or more collision subframes are one or more downlink subframes of the base station corresponding to one or more uplink subframes of the neighboring base station, control the RF unit to transmit, to the user equipment, an information bitmap indicating at least one restricted subframe of the one or more collision subframes, and drop the ACK/NACK information at a transmission timing of the ACK/NACK information when the transmission timing belongs to the at least one restricted subframe, and control the RF unit to transmit the ACK/NACK information at the transmission timing when the transmission timing belongs to a downlink subframe indicated by the DL-UL configuration and does not belong to the at least one restricted subframe, wherein the information bitmap is specifically configured to the user equipment, wherein the first downlink subframe is a downlink subframe of the base station other than the at least one restricted subframe, and wherein a physical downlink control channel, a physical downlink shared channel, and a physical hybrid automatic retransmit request indicator channel are restricted to be received at the user equipment in the at least one restricted subframe.

10. The base station according to claim 9, wherein the DL-UL configuration used in the base station is different from the neighboring DL-UL configuration used in the neighboring base station adjacent to the base station.

11. The base station according to claim 9, wherein the processor is further configured to control the RF unit to transmit the ACK/NACK information in an available downlink subframe indicated by the DL-UL configuration after the transmission timing when the transmission timing belongs to the at least one restricted subframe.

* * * * *